(12) United States Patent
Salkewicz

(10) Patent No.: US 8,713,153 B2
(45) Date of Patent: Apr. 29, 2014

(54) DOMAIN ISOLATION THROUGH VIRTUAL NETWORK MACHINES

(75) Inventor: William Salkewicz, Los Gatos, CA (US)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 13/620,539

(22) Filed: Sep. 14, 2012

(65) Prior Publication Data

US 2013/0014234 A1 Jan. 10, 2013

Related U.S. Application Data

(60) Continuation of application No. 12/944,600, filed on Nov. 11, 2010, now Pat. No. 8,271,640, which is a division of application No. 11/869,746, filed on Oct. 9, 2007, now Pat. No. 7,908,395, which is a continuation of application No. 10/461,761, filed on Jun. 12, 2003, now Pat. No. 7,281,039, which is a continuation of application No. 09/220,413, filed on Dec. 24, 1998, now Pat. No. 6,609,153.

(51) Int. Cl.
*G06F 15/173* (2006.01)

(52) U.S. Cl.
USPC .......................................................... 709/223

(58) Field of Classification Search
CPC ............................ H04L 12/28; H04L 12/4641
USPC ................... 709/223–227; 370/389, 400–405
See application file for complete search history.

(56) References Cited

U.S. PATENT DOCUMENTS

| | | |
|---|---|---|
| 4,815,128 A | 3/1989 | Malek |
| 5,157,777 A | 10/1992 | Lai et al. |
| 5,262,906 A | 11/1993 | Mazzola |
| 5,309,437 A | 5/1994 | Perlman et al. |
| 5,381,547 A | 1/1995 | Flug et al. |
| 5,398,336 A | 3/1995 | Tantry et al. |
| 5,459,717 A | 10/1995 | Mullan et al. |
| 5,497,463 A | 3/1996 | Stein et al. |
| 5,550,816 A | 8/1996 | Hardwick et al. |
| 5,604,680 A | 2/1997 | Bamji et al. |
| 5,625,836 A | 4/1997 | Barker et al. |
| 5,659,796 A | 8/1997 | Thorson et al. |
| 5,684,974 A | 11/1997 | Onodera |
| 5,692,193 A | 11/1997 | Jagannathan et al. |

(Continued)

OTHER PUBLICATIONS

Visual Segmentation and the Dynamic Binding Problem: Improving the—Smith (1993); www.cis.plym.ac.uk/MAST.sub.--Reports/ct92-15-003.ps.gz.
Java is Type Safe—Probably—Drossopoulou, Eisenbach (1996) www-asds.doc.ic.ac.uk/deptechrep/DTR96-8.pdf.
Troubleshooting Frame Relay Connections; www.alteridem.net/networking/itg.sub.--v1/itg.sub.--fmrl.htm.
Cisco: RADIUS Commands; www.jasien.gda.pi/cisco/cs.sub.--rad.htm.
Cisco: ATM commands, www.jasien.gda.pl/cisco/watm.htm.

(Continued)

*Primary Examiner* — Chirag R Patel
(74) *Attorney, Agent, or Firm* — Blakely, Sokoloff, Taylor & Zafman LLP

(57) ABSTRACT

A method and device for communicating information resources between subscriber end stations and nodes belonging to different network domains is described. The device instantiates different virtual network machines for different network domains using separate independently administrable network databases. Each of the administrable chores of the separate independently administrable network databases includes the assignment of access control and the configuration of the policies for those network databases. The policies include traffic filtering policies to indicate what kind of information payloads can be carried, traffic and route filtering policies to indicate what paths through the network will be used for each payload carried. Each of the network domains includes one of the different virtual network machines and each of the different network domains is virtually isolated from other network domains.

26 Claims, 21 Drawing Sheets

(56) References Cited

U.S. PATENT DOCUMENTS

| | | | |
|---|---|---|---|
| 5,737,333 | A | 4/1998 | Civanlar et al. |
| 5,761,477 | A | 6/1998 | Wahbe et al. |
| 5,768,271 | A | 6/1998 | Seid et al. |
| 5,784,707 | A | 7/1998 | Khalidi et al. |
| 5,825,772 | A | 10/1998 | Dobbins et al. |
| 5,828,844 | A | 10/1998 | Civanlar et al. |
| 5,832,224 | A | 11/1998 | Fehskens et al. |
| 5,867,666 | A | 2/1999 | Harvey |
| 5,872,973 | A | 2/1999 | Mitchell et al. |
| 5,892,912 | A | 4/1999 | Suzuki et al. |
| 5,893,107 | A | 4/1999 | Chan et al. |
| 5,963,556 | A | 10/1999 | Varghese et al. |
| 5,974,463 | A | 10/1999 | Warrier et al. |
| 6,026,091 | A | 2/2000 | Christie et al. |
| 6,029,067 | A | 2/2000 | Pfundstein |
| 6,031,623 | A | 2/2000 | Smith et al. |
| 6,035,105 | A | 3/2000 | McCloghrie et al. |
| 6,047,325 | A | 4/2000 | Jain et al. |
| 6,061,349 | A | 5/2000 | Coile et al. |
| 6,064,666 | A | 5/2000 | Willner et al. |
| 6,065,054 | A | 5/2000 | Dutcher et al. |
| 6,084,892 | A | 7/2000 | Benash et al. |
| 6,097,719 | A | 8/2000 | Benash et al. |
| 6,105,027 | A | 8/2000 | Schneider et al. |
| 6,125,391 | A | 9/2000 | Meltzer et al. |
| 6,128,665 | A | 10/2000 | Iturralde |
| 6,145,011 | A | 11/2000 | Furukawa et al. |
| 6,151,628 | A * | 11/2000 | Xu et al. .................. 709/225 |
| 6,157,955 | A | 12/2000 | Narad et al. |
| 6,167,052 | A | 12/2000 | McNeill et al. |
| 6,172,981 | B1 | 1/2001 | Cox et al. |
| 6,219,699 | B1 | 4/2001 | McCloghrie et al. |
| 6,223,218 | B1 | 4/2001 | Iijima et al. |
| 6,226,260 | B1 | 5/2001 | McDysan |
| 6,226,675 | B1 | 5/2001 | Meltzer et al. |
| 6,226,751 | B1 | 5/2001 | Arrow et al. |
| 6,229,787 | B1 | 5/2001 | Byrne |
| 6,285,680 | B1 | 9/2001 | Steinka et al. |
| 6,289,017 | B1 | 9/2001 | Shani et al. |
| 6,295,556 | B1 | 9/2001 | Falcon et al. |
| 6,321,133 | B1 | 11/2001 | Smirnov et al. |
| 6,335,926 | B1 | 1/2002 | Silton et al. |
| 6,339,595 | B1 | 1/2002 | Rekhter et al. |
| 6,374,302 | B1 | 4/2002 | Galasso et al. |
| 6,421,730 | B1 | 7/2002 | Narad et al. |
| 6,438,127 | B1 | 8/2002 | Le Goff et al. |
| 6,484,213 | B1 | 11/2002 | Nouri |
| 6,493,349 | B1 | 12/2002 | Casey |
| 6,522,641 | B1 | 2/2003 | Siu et al. |
| 6,570,875 | B1 | 5/2003 | Hegde |
| 6,590,861 | B1 | 7/2003 | Vepa et al. |
| 6,604,123 | B1 | 8/2003 | Bruno et al. |
| 6,609,153 | B1 | 8/2003 | Salkewicz |
| 6,792,605 | B1 | 9/2004 | Roberts et al. |
| 6,794,854 | B2 | 9/2004 | Nakatsu et al. |
| 6,795,854 | B1 | 9/2004 | Parker et al. |
| 6,826,597 | B1 | 11/2004 | Lonnroth et al. |
| 6,891,838 | B1 | 5/2005 | Petite et al. |
| 7,055,173 | B1 | 5/2006 | Chaganty et al. |
| 7,281,038 | B1 | 10/2007 | Salkewicz |
| 7,908,395 | B1 | 3/2011 | Salkewicz |
| 2002/0062344 | A1* | 5/2002 | Ylonen et al. ............. 709/204 |
| 2011/0060819 | A1 | 3/2011 | Salkewicz |

OTHER PUBLICATIONS

A Formal Specification of Java Virtual Machine Instructions—Qian (1997) www.cis.upenn.edu/.about.bcpierce/courses/629/papers/Qian-JVMspec.ps.gz.

Search Party: An Approach to Reliable Multicast with Local—Adam Costello Http (1998) www.cs.berkeley.edu/.about.amc/research/search-party/paper-2.ps.gz.

A Scalable HTTP Server: The NCSA Prototype—Katz, Butler, McGrath (1994) www.ncsa.uiuc.edu/InformationServers/Conferences/CERNwww94/www94.ncsa.ps.

Lightweight Application Level Multicast Tunneling using—Parnes, Synnes, Schefstrom (1998) www.cdt.luth.se/.about.unicorn/papers/JoCC/mTunnel.pdf.

Redback Networks Awarded Best of Show at Networld+Interop Las Vegas, dated May 11, 1998, (4 pgs).

Non-Final Office Action, U.S. Appl. No. 12/944,607, dated Apr. 8, 2011, 20 pages.

Notice of Allowance, U.S. Appl. No. 11/869,741, dated Apr. 19, 2011, 18 pages.

Non-Final Office Action, U.S. Appl. No. 12/944,600, dated Mar. 28, 2011, 20 pages.

Notice of Allowance, U.S. Appl. No. 11/869,741, dated Sep. 1, 2011, 21 pages.

Notice of Allowance, U.S. Appl. No. 09/220,413, dated May 12, 2003, 5 pages.

Non-Final Office Action, U.S. Appl. No. 09/220,413, dated Jul. 17, 2002, 8 pages.

Final Office Action, U.S. Appl. No. 09/220,413, dated Jan. 24, 2002, 9 pages.

Non-Final Office Action, U.S. Appl. No. 09/220,413, dated Aug. 10, 2001, 13 pages.

Notice of Allowance, U.S. Appl. No. 10/461,761, dated Sep. 24, 2007, 5 pages.

Non-Final Office Action, U.S. Appl. No. 10/461,761, dated Jan. 24, 2007, 28 pages.

Notice of Allowance, U.S. Appl. No. 10/020,388, dated Sep. 12, 2007, 3 pages.

Final Office Action, U.S. Appl. No. 10/020,388, dated Oct. 12, 2006, 18 pages.

Non-Final Office Action, U.S. Appl. No. 10/020,388, dated Jun. 21, 2006, 15 pages.

Final Office Action, U.S. Appl. No. 10/020,388, dated Dec. 5, 2005, 14 pages.

Non-Final Office Action, U.S. Appl. No. 10/020,388, dated Aug. 22, 2005, 13 pages.

Non-Final Office Action, U.S. Appl. No. 10/020,388, dated Mar. 4, 2005, 15 pages.

Non-Final Office Action, U.S. Appl. No. 10/020,388, dated Sep. 13, 2004, 14 pages.

Notice of Allowance, U.S. Appl. No. 11/869,746, dated Nov. 9, 2010, 11 pages.

Non-Final Office Action, U.S. Appl. No. 11/869,746, dated May 3, 2010, 19 pages.

Non-Final Office Action, U.S. Appl. No. 11/869,741, dated Sep. 21, 2009, 41 pages.

Notice of Allowance, U.S. Appl. No. 11/869,741, dated May 24, 2010, 12 pages.

Notice of Allowance, U.S. Appl. No. 12/944,600, dated Sep. 1, 2011, 12 pages.

Notice of Allowance, U.S. Appl. No. 12/944,607, dated Sep. 20, 2011, 9 pages.

Non-Final Office Action, U.S. Appl. No. 12/944,602, dated Aug. 5, 2011, 15 pages.

Notice of Allowance, U.S. Appl. No. 11/869,741, dated Jan. 6, 2012, 14 pages.

Notice of Allowance, U.S. Appl. No. 12/944,622, dated Feb. 16, 2012, 24 pages.

Notice of Allowance, U.S. Appl. No. 12/944,600, dated May 16, 2012, 9 pages.

Notice of Allowance, U.S. Appl. No. 12/944,607, dated May 17, 2012, 9 pages.

"Leading Network Service Providers Back Subscriber Management System From Redback Networks", dated Mar. 30, 1998, 4 pages.

"Network Equipment—Startup touts hardware for low-cost DSL access", Loring Wirbel; Mar. 30, 1998, Issue: 1000, Section: Design, 4 pages.

"Redback Networks Receives Strong Carrier Support for Subscriber Management System", dated Mar. 30, 1998, 4 pages.

"Redback Networks' Subscriber Management System Delivers the Missing Link for DSL: Scalable Deployment", dated Mar. 30, 1998, 8 pages.

(56) References Cited

OTHER PUBLICATIONS

Adve, V., et al., "Performance Analysis of Mesh Interconnection Networks with Deterministic Routing", IEEE Transactions on Parallel and Distributed Systems, vol. 5, No. 3, pp. 225-246, Mar. 1994.
Akers, Steve, "Architecture Specification", Spring Tide Networks, Inc., STN2000, Edge Translation Switch, Jul. 23, 1998, 80 pages.
Alaettinoglu, Cengiz, et al., "The Viewserver Hierarchy for Interdomain Routing: Protocols and Evaluation", Oct. 1995, pp. 1396-1410.
Almquist, P., "Towards Requirements for IP Routers", Network Working Group, RFC 1716, Downloaded from http://andrew2.andrew.cmu.edu/rfc/rfc1716.html, Nov. 1994.
Austin, T., et al., "Efficient Detection of All Pointer and Array Access Errors", Proceedings of the ACM Conference on Programming Language Design and Implementation, pp. 290-301, Jun. 1994.
Becker, et al., "Creating Domain Specific Libraries: a methodology, design guidelines, and an implementation", (1994), www.sc.cmu.afs/cs/user/mb81/www/papers/Creating.sub.--Domain.sub.--Specfic.sub.--Libraries.ps. 11 pages.
Bhagwat, "A Mobile Networking System based on Internet Protocol (IP)", (1993), www.cs.umd.edu/projects/mcml/papers/Usenix93.ps, 14 pages.
Bolla, R., et al., "A Neural Strategy for Optimal Multiplexing of Circuit-And-Packet-Switched Traffic", GLOBECOM '92 IEEE Communication Society, pp. 1324-1330, Dec. 1992.
Brooks, R., et al., "An Optimizing Compiler for Lexically Scoped LISP", ACM Symposium on LISP and Functional Programming, pp. 261-275, Aug. 1982.
Buzen, J.P., et al., "The Evolution of Virtual Machine Architecture", AFIPS National Computer Conference, pp. 291-299, Jun. 1973.
Cmelik, B., et al., "Shade: A Fast Instruction-Set Simulator for Execution Profiling", ACM SIGMETRICS Conference on Measurement and Modeling of Computer Systems, pp. 128-137, May 1994.
Comer, D., Computer Networks and Internets, Prentice Hall, 1997.
Dally, W.J., et al., "Deadlock-Free Adaptive Routing in Multicomputer Networks Using Virtual Channels", IEEE Transactions on Parallel and Distributed Systems, vol. 4 No. 4, pp. 466-475, Apr. 1993.
Dally, W.J., et al., "Deadlock-Free Message Routing in Multiprocessor Interconnection Networks", IEEE Transactions on Computers, vol. C-36, No. 5, pp. 547-553, May 1987.
Dally, W.J., "Performance Analysis of k-ary n-cube Interconnection Networks", IEEE Transactions on Computers, vol. 39, No. 6, pp. 775-785, Jun. 1990.
Dally, W.J., "Virtual-Channel Flow Control", Proc. 17th International Symposium on Computer Architecture, pp. 60-68, May 1990.
Davidson, J., et al., "Cint: A RISC Interpreter for the C Programming Language", Proceedings of the SIGPLAN '87 Symposium on Interpreters and Interpretive Techniques, pp. 189-197, Jun. 1987.
Deutsch, L.P., et al., "Efficient Implementation of the Smalltalk-80 System", Proceedings of the 11th Annual ACM Symposium on Principles of Programming Languages, pp. 297-302, Jan. 1984.
Diaz, Kim, et al., Press Release, Redback Networks' Subscriber Management System Delivers the Missing Link for DSL: Scalable Deployment, Redback Networks, Mar. 30, 1998.
Duato, J., "A New Theory of Deadlock-Free Adaptive Routing in Wormhole Networks", IEEE Transactions on Parallel and Distributed Systems, vol. 4, No. 12, pp. 1320-1331, Dec. 1993.
Ellis, J., et al., "Safe, Efficient Garbage Collection for C++", Proceedings of the 1994 USENIX C++ Conference, pp. 143-177, Apr. 1994.
Estrin, Deborah, "A Protocol for Route Establishment and Packet Forwarding Across Multidomain Internets", Member, IEEE, Martha Steenstrup, Member, IEEE, and Gene Tsudik, Member, IEEE, Feb. 1993, pp. 56-70.
Fischer, C., et al., "The Implementation of Run-Time Diagnostics in Pascal", IEEE Transactions on Software Engineering, vol. SE-6, No. 4, pp. 313-319, Jul. 1980.

Gallager, R., "Scale Factors for Distributed Routing Algorithms", NTC '77 Conference Record, Dec. 1977.
Glass, C.J., et al., "The Turn Model for Adaptive Routing", Proc. 19th International Symposium on Computer Architecture, pp. 278-287, May 1992.
Goldberg, R., "Survey of Virtual Machine Research", Honeywell Information Systems and Harvard University, pp. 34-45, Jun. 1974.
Heinanen, Juha , "VPN Support for MPLS", Dec. 1997, 6 pages, Internet Engineering Task Force, Telia Finland, Inc.
Jesshope, C.R., et al., "High Performance Communications in Processor Networks", Proc. 16th International Symposium on Computer Architecture, pp. 150-157, May 1989.
Kirkpatrick, S., et al., "Optimization by Simulated Annealing", Science, vol. 220, No. 4598, pp. 671-680, May 1983.
Leinwand, A., et al., Cisco Router Configuration, MacMillan Technical Publishing, Indianapolis, IN, 1998.
Li, K., et al., "Memory Coherence in Shared Virtual Memory Systems", ACM Transactions on Computer Systems, vol. 7, No. 4, pp. 321-359, Nov. 1989.
Linder, D.H., et al., "An Adaptive and Fault Tolerant Wormhole Routing Strategy for k-ary n-cubes", IEEE Transactions on Computers, vol. 40, No. 1, pp. 2-12, Jan. 1991.
Lindstrom, Annie, "Bridging the Gap, the Buck Doesn't Stop at DSLAM", Sep. 1, 1998, 10 pages.
Luckham, D., et al., "Verification of Array, Record, and Pointer Operations in Pascal", ACM Transactions on Programming Languages and Systems, vol. 1, No. 2, pp. 226-244, Oct. 1979.
Malkin, Gary S.,"Dial-in Virtual Private Networks Using Layer 3 Tunneling", Bay Networks, gmalkin@baynetworks.com, pp. 555-561, 1997.
May, C., "MIMIC: A Fast System/370 Simulator", Proceedings of the SIGPLAN '87 Symposium on Interpreters and Interpretive Techniques, pp. 1-13, Jun. 1987.
Paxton, "End-to-End Routing Behavior in the Internet", 1996, ftp.ee.lbl.gov/papers/routing.SIBCOMM.ps.Z, 21 pages.
Porras, et al., "EMERALD: Event Monitoring Enabling Responses to Anomalous Live Disturbances", (1997), www.csl.sri.com/emerald/Emerland-NISS97.ps.gz, 13 pages.
Pryce, Crane, "A Model of Interaction in Concurrent and Distributed Systems", 1998, www.cs.city.ac.uk/homes/jsc/writing/ares.ps.gz.
Rakotonirainy, Chilvers, "A Distributed Infrastructure for Mobile Computing", 1997; python.via.ecp.fr/workshops/1997-10/proceedings/rakotonirainy/ps.
Shields, Clay, The HIP Protocol for Hierarchical Multicast Routing, 1998, www.cse.ucsc.edu/research/ccrg/publications/clay.podc98.ps.gz.
Sites, R., et al., "Binary Translation", Communications of the ACM, vol. 36 No. 2, pp. 69-81, Feb. 1993.
Stallings, W., "High Speed Networks: TCP/IP and ATM Design Principles", Prentice Hall, 1998.
Stuckenschmidt, et al., "Capturing Uncertainty in Models of Expertise", (1997), www.informatiok.uni-bremen.de./.about.kcr/paper/capturing.ps.gz, 15 pages.
Talia, D., "Message-Routing Systems for Transputer-Based Multicomputers", IEEE Micro, No. 3, pp. 62-72, Jun. 1993.
Thekkath, et al., "Frangipani: A Scalable Distributed File System", (1997), www.researcb.digital.com/SRC/personal/Ed.sub.--Lee/Papers/sosp97.- ps, 14 pages.
Wahbe, R., et al., "Efficient Software-Based Fault Isolation", Proceedings of the Symposium 14th ACM on Operating System Principles, pp. 203-216, Dec. 1993.
Yang, C.S., et al., "Performance Evaluation of Multicast Wormhole Routing in 2D-Torus Multicomputers", ICCI '92 IEEE Computer Society, pp. 173-178, May 1992.
Yantchev, J. , "Adaptive, Low Latency Deadlock-Free Packet Routing for Networks of Processors", IEEE Proceedings, vol. 136, Pt. E, No. 3, pp. 178-186, May 1989.

\* cited by examiner

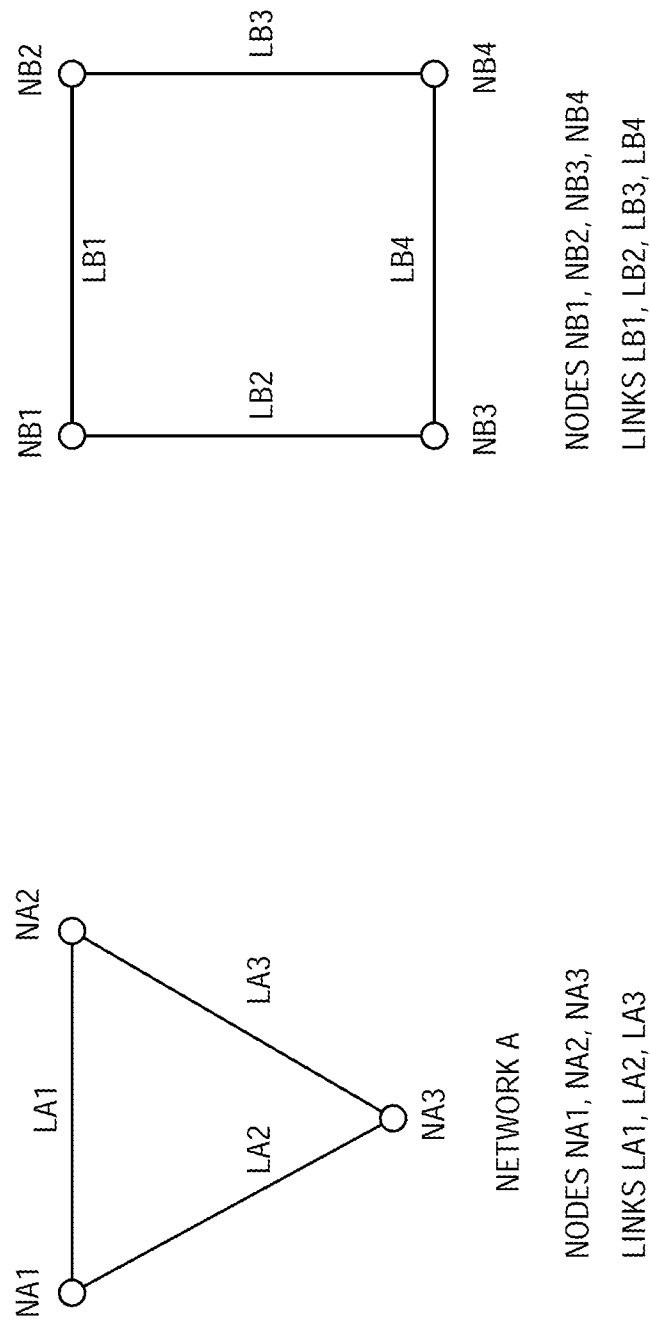

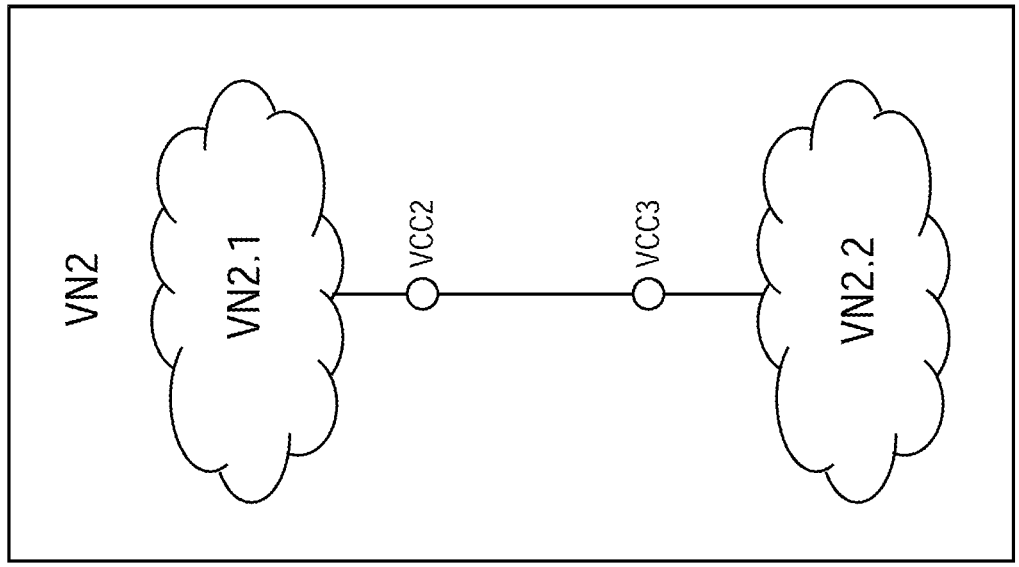
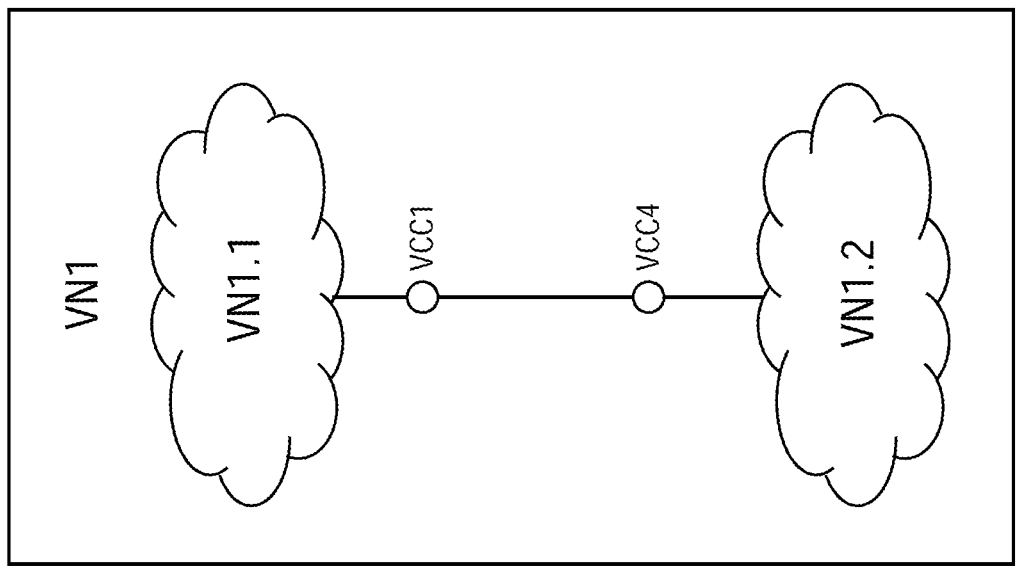
FIG. 7

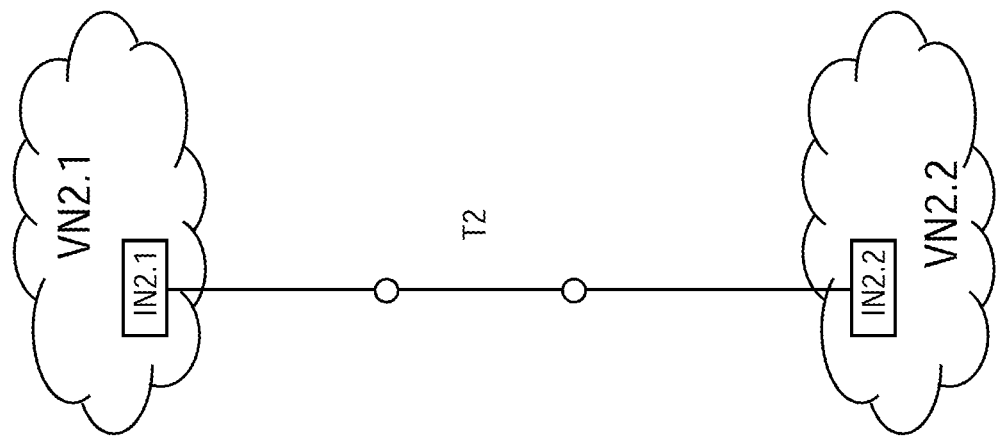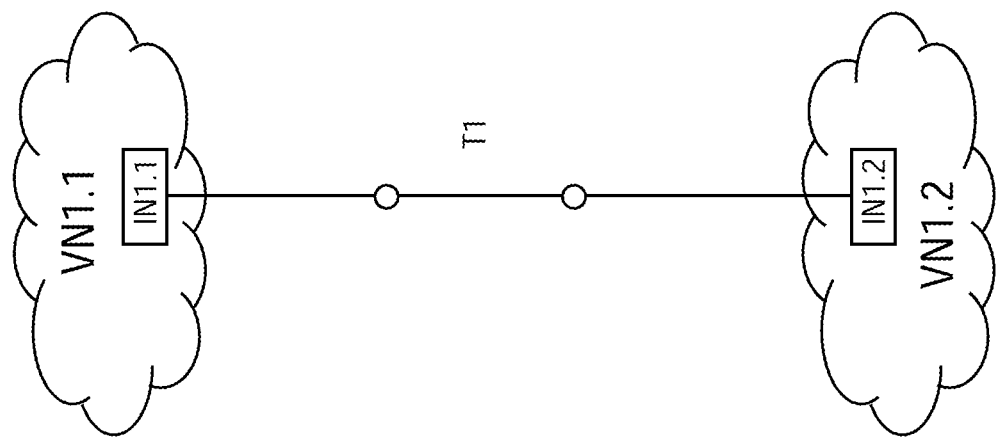
FIG. 10

DOMAIN ISOLATION THROUGH VIRTUAL NETWORK MACHINES

CROSS-REFERENCE TO RELATED APPLICATIONS

This is a continuation application of Ser. No. 12/944,600, filed Nov. 11, 2010, now U.S. Pat. No. 8,271,640, which is a divisional application of Ser. No. 11/869,746, filed Oct. 9, 2007, now U.S. Pat. No. 7,908,395, which is continuation of Ser. No. 10/461,761, filed Jun. 12, 2003, now U.S. Pat. No. 7,281,039, which is a continuation of Ser. No. 09/220,413, filed Dec. 24, 1998, now U.S. Pat. No. 6,609,153.

FIELD

The present invention relates in general to communications networks, and more particularly, to the operation of network devices that can operate in multiple virtual networks simultaneously.

BACKGROUND

Description of the Related Art

Network Layering and Protocols

A communication network provides information resources transfer services that transfer information resources among devices attached to the network. Information resources, as the term is used herein, includes any form of information that can be transmitted over a network for use by or with any end station or network device connected to the network. Information resources, for example, may include computer programs, program files, web pages, data, database information, objects, data structures, program icons, graphics video information or audio information. *Computer Networks and Internets*, Douglas E. Corner, Prentice Hall, 1997, provides extensive information about communication networks.

Networks are built from devices or stations called nodes, and the communications channels that interconnect the nodes, called links. A set of nodes and links under one administrative authority is called a network domain. Communication between end stations attached to a network ordinarily is achieved through the use of a set of layered protocols. These protocols are generally described by reference to the Open Systems Interconnection (OSI) computer communications architecture. The standard OSI architecture includes seven layers: application, presentation, session, transport, network, data link and physical. A communication network may employ fewer than the full seven layers. However, the layer 2 and the layer 3 software protocols ordinarily play a prominent role in the transfer of information between interconnected networks and between end stations connected to the networks.

The physical layer is the lowest layer (layer 1) of the OSI model. There are numerous technologies that can be employed to build networks at layer 2. Layer 2 networks can be "connection oriented", meaning that a connection must be established before data can flow between two stations; ATM. Frame Relay, and X.25 are examples of connection oriented layer 2 protocols. Layer 2 networks can also be connection-less, meaning data can be transmitted without establishing any connection in advance; Ethernet and FDDI are two examples of connection-less layer 2 protocols.

In order to provide services useful to end users, the devices in a network must perform higher layer functions to create what are called "virtual networks". The "Internet" is one example of a very popular and public virtual network. The Internet uses the IP protocol to provide the higher layer (layer 3) functions required to support operation of the virtual network. There are many other private (virtual) networks that also uses the IP protocol. The term "internet" with a small "i" is used to differentiate between these less well known private internets, and the very popular and public large "I" Internet. There are many other protocols that can be used to construct virtual networks at layer 3, including IPX, DECnet, AppleTalk, CLNP, etc. There are many other private and public networks using these other layer 3 protocols, either independent of or in conjunction with the IP protocol.

Thus, networks can be built at many different layers. Each layer has its own function and its own type of nodes and links. Higher layer networks are built "on top of" lower layer networks. In other words, nodes at a given layer may use the services of the next lower layer to provide links for communication with peer nodes (i.e. nodes at the same layer on other devices). Routers are examples of nodes in a layer 3 network. Bridges are examples of nodes in layer 2 networks.

Network Domains

A network domain as the term is used herein refers to the set of nodes and links that are subject to the same administrative authority. A single administrative authority may administer several networks in separate domains, or several layers of the same network in a single domain, or any combination. There are actually several possible administrative domains in any large virtual network. The boundaries of a network domain can be defined along the lines dividing layers of the protocol stacks. For instance, the same layer 1 physical devices and physical connections may have several layer 2 network domains layered onto them. These layer 2 domains, in turn, may have one or more layer 3 domains layered on top of them. A network domain may even transcend the boundaries between layers such that a layer 2 network and a layer 3 network may be part of the same network domain.

The administration of even a single network domain can be quite complex. Virtual networks have administrative authorities associated with them to control their higher layer functions. The cost of administering a network, physical or virtual, can be enormous, and is often the largest cost item in the operations of a network.

When several virtual networks are layered on top of the same layer 2 service or another virtual network, the boundaries between network domains may be somewhat obscure. The boundaries between the domains of the overlaid virtual networks intersect at points where they must share physical or virtual resources. In practice, the administrators of the overlaid virtual networks are very concerned about sharing resources, especially when they are competing commercial entities. Concerns arise about integrity, privacy, and security of data and network control information flowing across the shared resources at the lower layers. The administrators of the underlying networks are called upon to solve complex administrative problems. The costs of administering these networks increases quickly with the number of virtual networks, their size, the complexity and compatibility of their individual policies, and increased demands for security, integrity, and isolation between domains.

Network Devices and Databases

The term network device is used here to refer to the collection of mechanisms (e.g. computer and communications hardware and software) used to implement the functions of a station in a network. A network device contains some capacity to store and operate on information in databases in addition to the ability to transmit and receive information to and from other devices on the network. Examples of network devices include but are not limited to routers, bridges, switches, and devices that perform more than one of these functions (e.g. a device that does both routing and bridging).

A router is an example of a network device that serves as an intermediate station. An intermediate station is a network device that interconnects networks or subnetworks. A typical router comprises a computer that attaches to two or more networks and that provides communication paths and routing functions so that data can be exchanged between end stations attached to different networks. A router can route packets between networks that employ different layer 2 protocols, such as Token Ring, Ethernet or FDDI, for example. Routers use layer 3 protocols to route information resources between interconnected networks. Nothing precludes a network device that operates as an intermediate station from also operating as an end station. An IP router for example typically also operates as an end station.

A router can understand layer 3 addressing information, and may implement one or more routing protocols to determine the routes that information should take. A multiprotocol router runs multiple layer 3 protocols such as IP, IPX or AppleTalk for example. A router also be characterized as being multiprotocol if it runs multiple adaptive routing protocols such as RIP, BGP or OSPF all feeding a single IP layer.

The network device router configuration of FIG. 1A depicts what is often referred to in industry as a multi-protocol bridge/router. In this illustrative example, there are separate databases for three layer 2/3 networking protocols: bridging, IP routing, and IPX routing. The example IP database employs both the OSPF and RIP dynamic routing protocols. Thus, the intermediate station node of FIG. 1A includes both multiple networking protocols and multiple routing protocols.

A bridge is another example of a network device that serves as an intermediate station. A typical bridge comprises a computer used to interconnect two local area networks (LANs) that have similar layer 2 protocols. It acts as an address filter, picking up packets from one LAN that are intended for a destination on another LAN and passing those packets on. A bridge operates at layer 2 of the OSI architecture.

The term network database will be used to refer to all the control information housed in a network device required to support the device's operation in a set of one or more networks. Each device in a network holds its own network database. In order for the network at large to operate properly, the network databases of all network devices in a network domain should be consistent with each other. The network database control information defines the behavior of its network device. For example, not only might it determine whether the network device will function as a router or a bridge or a switch, but also it will determine the details of how the device will perform those functions.

When a network device is deployed to operate in multiple domains, its network database can become quite complex. The cost of administering the network device increases significantly when the network database is more complex. The cost of administration is already the most significant cost of operating many networks, and the trend toward greater complexity through greater use of virtual networking continues unabated.

The information found in a typical network database includes, but is not limited to, data used to configure, manage, and/or monitor operations of:

Communications Hardware (e.g. layer 1 transceivers/drivers/chips etc.)
Computer Hardware
Computer Software
Layer 2 Addressing
Layer 2 Connections (Layer 2 interfaces)
Traffic filter policies
Bridging (IEEE 802.1D)
Bridge filters and/or policies
Network (layer 3) Addressing
Layer 3 Connections (Layer 3 interfaces)
(Network/layer 3) Address Translation (NAT) policies
Access Control (e.g. user names and password)
Access policies (e.g. what user can use what services)
Routing (IETF RFC 1812)
Routing Protocols (e.g., BGP, OSPF, RIP, IGRP, etc.)
Route filters and policies (e.g. route leaking)
Tunneling
Tunneling Protocols (e.g., L2TP, GRE, PPTP, etc.)

A single network device can operate in one or more (virtual) network domains. For each domain in which a device operates, it needs to store information about that domain in some database form.

Much of the information in a network database must be configured manually; particularly the policy information as it must reflect the administrator's subjective wishes for how the network should operate. Manual configuration involves human effort, which can become expensive, especially as the number of policies and their complexity increases. Network administrative chores include the assignment of user names, passwords, network addresses or other user identifiers, and configuration of policy databases. This configuration and management may be used to establish traffic filtering policies such as what kind of information payloads will be carried. Traffic and Route filtering policies may be established to determine what paths through the network will be used for each payload carried. Access control policies may be to dictate which users at which end stations have access to which services at other end stations. Security policies may be established to ensure the integrity of the information payloads. Each configured bit of policy somehow finds its way into the network database of the device implementing the policy.

*Cisco Router Configuration* by A. Leinwand, B. Pinsky and M. Culpepper, published by MacMillan Technical Publishing, Indianapolis, Ind., 1998 provides an extensive treatment of the configuration of the databases of Cisco System routers. This is just one example of a network device database.

Building Virtual Networks

The layering of software protocols in accordance with the ISO architecture makes possible the creation of "virtual networks". Virtual networks are to be contrasted with physical networks. Two physical networks which have no physical devices or links in common, can be said to be physically isolated from each other. Physical isolation may be required in order to ensure that a network has the highest levels of security and integrity.

Physical networks are defined at layer 1 of the OSI model. Virtual networks, on the other hand, are created at higher layers. It is possible to create multiple virtual networks all sharing common physical resources. A network is definitely virtual if it shares a common physical medium or device, such as an intermediate station, with any other (virtual) network. There are many conventional technologies and many commercially available products which can be used to build many types of virtual networks. For example, virtual circuits are a layer 2 construct that can be employed to create virtual networks.

It has been common practice in the industry for phone companies to offer connection oriented layer 1 and 2 services to Internet Service Providers (ISPs), corporations, and residential customers. These customers may build one or more higher layer (layer 3 and above) virtual networks on top of such publicly available layer 1 and 2 services. The higher layer virtual networks share a common set of layer 1 and 2 services, each having it's private set of virtual circuits.

A PC or a server are examples of end stations. End stations located at home or business, for example, may connect into an internet through an internet service provider (ISP). There are regional, local and global ISPs. In most cases, local ISPs connect into the regional ISPs which in turn connect into other regional or national ISPs. FIG. 1B illustrates an example of a connections to an ISP. In the example, home user end stations may connect via modems over dial-up lines to an ISP's router or remote access server (RAS). This data link often runs the PPP (Point-to-Point Protocol) which encapsulates and delivers packets to the ISP's site. Business user end systems may connect to the ISP through leased lines such as T1 lines or T3 lines depending on bandwidth requirements for example. Other examples of typical connection options between home or business users and an ISP include ISDN, T1, fractional T1, various optical media, and xDSL. ISPs may also offer tunnel mode or transport mode services that help businesses set up virtual private networks (VPNs) between remote end stations and virtual dial-up services for remote and mobile end stations.

The ISP serves as a conduit for information transmitted between the end stations in the home and other end stations connected to the Internet.

A virtual circuit is a dedicated communication channel between two end stations on a packet-switched or cell-relay network. ATM, Frame Relay, and X.25 are all different types of virtual circuit based networking technologies. A virtual circuit follows a path that is programmed through the intermediate stations in the network.

There are permanent and switched virtual circuits. A permanent virtual circuit (PVC) is permanent in the sense that it is survives computer reboots and power cycles. A PVC is established in advance, often with a predefined and guaranteed bandwidth. A switched virtual circuit (SVC) is "switched" in the sense that it can be created on demand analogous to a telephone call. Both PVCs and SVCs are "virtual" circuits in that they typically are not allocated their own physical links (e.g. wires), but share them with other virtual circuits running across the same physical links.

"Tunneling" is one mechanism for building higher layer networks on top of an underlying virtual network Tunneling has already gained acceptance in the industry and several technologies are either in operation or under development. Some of the tunneling protocols used in IP networks for example include L2TP, GRE, PPTP, and L2F. There are many other Tunneling technologies used in IP and other protocols.

Referring to FIGS. 2A-2B, there are shown network graphs representing two illustrative networks. Network A is represented by three nodes (NA1, NA2, and NA3), and three links (LA1, LA2, and LA3). Network B is represented by four nodes (NB1, NB2, NB3, and NB4) and four links (LB1, LB2, LB3, and LB4). As used herein, the term node may represent any end station or intermediate station, and the term link means any connection between nodes. If these are physical nodes and links, Networks A and B are physically isolated from each other. If these are virtual (circuit) links which actually depend on a shared physical medium, then the two (virtual) networks are said to be virtually isolated from each other.

Illustrative Networks A and B each may be part of different network domains. Independent administrative control may be exercised over each of the Network A and B domains, for example, through the configuration and management of intermediate stations such as bridges and routers.

Referring to FIGS. 2A and 2B, it will be appreciated that the independent administration of the Network A and Network B domains may result in incompatible policies as between the two domains. This is not a problem provided that the domains remain isolated from each other. Referring to FIG. 3, however, there is shown a network graph of Network C which comprises Networks A and B joined by link LJ. The isolation between Networks A and B, whether physical or virtual, is lost when they are joined in Network C. This joining of the two Networks A and B may create challenges to the administration of combined Network C. For example, despite the joining of the two networks, there still may be a need to apply different or even conflicting policies to each of Networks A and B. In essence, the administrative challenge is to maintain the administrative integrity of the Network A domain and the administrative integrity of the Network B domain despite the fact that both of these networks are part of Network C and are no longer physically isolated from each other.

FIG. 4 is an illustrative drawing of a segment of a single physical medium capable of carrying multiple information flows, each in its own virtual circuit (or channel). The physical medium may for instance be a cable or a wire or an optical fiber. The segment shown is carrying four independent information flows on four different virtual circuits; VC1, VC2, VC3, and VC4. These virtual circuits, for example, may be implemented using X.25, ATM, Frame Relay, or some other virtual circuit (or channelized) service.

FIG. 5 is an illustrative drawing representing an example of two virtual networks (VN1, and VN2) each made up of two independent network segments (VN1.1 and VN1.2 for VN1, and VN2.1 and VN2.2 for VN2). All segments connect to shared physical network resources. In this example, the shared network resources of FIG. 5 provide a virtual circuit service. A virtual circuit connection to an end station or intermediate station connection to a virtual circuit is called a virtual channel connection (VCC). VN1 connects at VCC1 and VCC4; and VN2 connects at VCC2 and VCC3. The shared network resources also provide virtual circuit service that connect VCC1 and VCC4 so as to join VN1.1 and VN1.2 into VN1 and so as to join VN2.1 and VN2.2 into VN2.

FIG. 6 is an illustrative drawing that provides additional details of some of the physical constituents of the virtual networks of FIG. 5. An intermediate station labeled VN1.1.VCC1 in VN1 connects segment VN1.1 to the VC service at VCC1. An intermediate station labeled VN1.2.VCC4 in VN1 connects segment VN1.2 to the VC service at VCC4. The VC service connects VCC1 to VCC4, linking VN1.1 to VN1.2 at the virtual circuit level. More specifically, physical media segments PM2, PM1 and PM5 and intermediate stations IS-A and IS-B provide the requisite physical infrastructure upon which the virtual circuit connection linking VN1.1 and VN1.2 is carried. This first virtual circuit connection serves as a network link between the VN1.1.VCC1 and VN1.2.VCC4 intermediate stations, to create one virtual network from the two segments VN1.1 and VN1.2.

Similarly, VCC2 and VCC3 are connected by the virtual circuit service, which connects intermediate stations VN2.1.VCC2 and VN2.2.VCC3, joining the VN2.1 and VN2.2 segments to form the virtual network labeled VN2. More particularly, physical media segments PM4, PM1 and PM3 and intermediate stations IS-A and IS-B provide the virtual connection linking VN2.1 and VN2.2. The second virtual circuit connection serves as a network link between the VN2.1.VCC2 and VN2.2.VCC3 intermediate stations, to create one virtual network from the two segments VN2.1 and VN2.2.

FIG. 7 is an illustrative drawing shows the logical or higher level view of the two virtual networks VN1 and VN2 of FIGS. 5 and 6. It will be appreciated from the view of FIG. 6 that they share physical resources, and it will be appreciated from the view of FIG. 7 that they are logically or virtually separate.

In the illustrative example of FIG. 8, two virtual networks are layered on top of a third virtual network. The sharing of a common set of physical or virtual network resources by several virtual networks increases the challenges of maintaining isolation and security of the individual virtual networks. Nevertheless, end user requirements for information resources, technology advances, economics, politics, and regulations surrounding the networking industry are driving commercial, private and government entities to share common physical and virtual network infrastructure. Therefore, there are ever increasing demands imposed upon network administrators, and vendors of networking equipment.

In the illustrative drawing of FIG. 8, three separate network domains intersect at node IN1: i) that of the Internet itself (including or subsuming that of the underlying VC service supporting the Internet); ii) that of private virtual network VN1; and iii) that of private virtual network VN2. This intersection of three network domains creates the potential for the kinds of administration and policy challenges discussed above. It will be noted that these networks are represented by different network "clouds" that symbolize the multifarious nodes and links in each of the networks.

The illustrative drawing of FIG. 8 illustrates an example of building two virtual networks on top of another virtual network similar to the previous example in FIGS. 5, 6 and 7. As before, the virtual networks being overlaid are each composed of two segments. Using a tunneling protocol or some other higher layer (layer 3 or above) mechanism, connections are made between nodes IN1.1 and IN1.2 to form a link to tie the two segments of VN1 together. This link is shown as T1 in FIGS. 9 and 10. Link T2 is similar, formed between nodes IN2.1 and IN2.2, to tie the two segments of VN2 together. The logical view of the two virtual networks in FIG. 9 is shown in FIG. 10, which bears a very strong resemblance to FIG. 7. The important difference to note between the examples is that in FIG. 7 a layer 2 VC network was used as the underlying network shared resources, and in FIG. 10 another virtual network was used as the underlying network shared resources; specifically, a tunneled service across the Internet. Thus, it will be appreciated that different virtual networks can be formed in different layers using the same underlying physical (or virtual) network resources.

Connections are established between nodes at the edge of the segments where they interface or connect to the shared (Internet) resources which are analogous to the virtual circuits in FIGS. 5, 6, and 7. These may be tunneled connections, or connections built using some other (connection-less) technology.

If we assume T1 and T2 are tunnels, the network databases of IN1.1, IN1.2, IN2.1, and IN2.2 would be augmented with data structures to manage the tunneling protocol at those endpoints, and the links made up from the tunnels. The network database of IN1.1 of FIG. 8 is depicted in FIG. 11 which highlights the "Tunneling Database" and the "IP Database".

Network Database Organization

If we examine the information in the network database for IN1, we will see that it should include configuration and policy information for three separate domains. Furthermore, since the information from the three domains must all coexist in the same physical device, there should be some way to structure the information and control its usage, such that the IN1 device operates correctly in all three domains. If all information for the device IN1 were stored in one monolithic from as is done conventionally, in addition to all the policies for each domain, inter-domain policies would also be required to ensure that information should be is kept private to its own domain.

The illustrative drawing of FIG. 12 is a generalized drawing of a conventional monolithic structure for a database that can be used to implement node IN1 of FIG. 7. The drawing depicts, in a conceptual fashion, an example of the typical organization of information within such a device. The illustrative device includes a first interface attached to VN1.1, a second interface attached to VN2.2 and a third interface attached to the Internet as the shared network resources. To illustrate the complexities in the database design, assume that both the virtual networks being overlaid on the Internet are also (private) IP networks (internets). Therefore all three networks/domains operate using the IP protocol, each having its own independent IP information to be stored in IN1's network database.

The database includes information such as rules used to articulate and implement administrative policies. The policies as articulated in the information and rules, for example, may include security rules, restrictions on access and dynamic routing protocols. In this illustrative router, the policy information and policy rules used to control the layer 3 IP protocol routing for all three networks are included in a single monolithic database.

However, as explained above, different network domains may have different or perhaps even conflicting policies. In order to provide at least some degree of isolation, additional and complicated "inter-domain" policy mechanisms must be added to manage the conflicts between policies on similar data from different domains. These mechanisms are configured and managed by an administrative authority. The dotted lines in FIG. 12 represent the points at which these inter-domain policy mechanisms would be introduced. The policies would attempt to divide the monolithic network database of node IN1 into three separate domain-specific sections. These dotted lines indicate that separation policy mechanisms are implemented, to provide at least some isolation of the information pertaining to VN1 from the information pertaining to VN2, and also from the information pertaining to the Internet (i.e. shared network resources).

It will be appreciated that the complexity and difficulty in defining and administering the policy mechanisms used to achieve isolation can be great. There is potential for a wide range of policies to be defined between domains. Everything in the spectrum from almost complete openness and sharing of all information between domains, to the other extreme of not sharing anything at all are possible. Certain pieces of a domain's database may want to be kept private (e.g. access control policy configuration), while other parts are shared to some extent (e.g. summarized routing and addressing information). The types of data, and the extent to which they can all be shared, are all subject to restriction through definition of inter-domain policies.

If we consider each boundary between a pair of domains (i.e. each dotted line through the network database of IN1 in FIG. 12) as a separate policy object, it will also be appreciated that the number of policy objects increases much faster than the number of domains. If D is the number of domains, then P, the number of policy objects can be calculated approximately as:

$$P=(D(D-1))/2$$

Thus, the number of policy objects increases approximately as (a proportion of) the square of the number of domains. In other words, the number of policy objects ordinarily increases much faster than the number of domains, especially as the number of domains gets large.

Another challenge in the administration of virtual networks arises because home or business end station users may wish to change the nature of their connections to the network from time to time. For instance, an end use may wish to utilize a more expensive higher bandwidth connection for business use and a less expensive lower bandwidth connection for home or personal use. Alternatively, for instance, an end user may wish opt to receive a video transmission on a higher bandwidth connection while still receiving other transmissions on lower bandwidth connections. An end user may even wish to change the ISP that he or she uses. Unfortunately, these changes often require intervention by a network administration authority to change the higher level binding between the end user station and the network. More specifically, the binding (or association) between the layer 2/1 virtual circuit service and a layer 3 intermediate device is 'hard', not dynamic, and the higher layer interface generally must be reconfigured by a network administrator to change the binding.

Thus, there has been a need for improved organization of network domain databases and improvements in the ability of a network user to change network domain. The present invention meets these needs.

BRIEF DESCRIPTION OF THE DRAWINGS

FIGS. 2A and 2B are network graphs of two illustrative example networks;

FIG. 7 is an illustrative drawing which shows the logical or higher level view of the two virtual networks VN1 and VN2 of FIGS. 5 and 6;

FIG. 10 is a logical or high level view of the two virtual networks of FIG. 9;

DESCRIPTION OF EMBODIMENTS

The present invention comprises a novel apparatus and method for managing operation of network devices that can operate in multiple virtual network domains. The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Virtual Network Machines

A Virtual Network Machine (VNM) as the term is used herein to describe the collection of processes and mechanisms that operate on a network device to implement the functions of a node in a virtual network. The preferred embodiment for the VNM is as a set of computer programs and related data structures encoded in electronic memory of a network device and used to operate on information, consuming some portion of a network device's computer and memory storage capacity. The functionality of a virtual network machine can be that of a router, bridge or switch, depending on what is configured in its network database. The native resources of a network device include its processor(s), memory, I/O, communication hardware and system software. The native resources of a network device, for example, may include peripheral devices or even a server computer which may, for instance, provide information about end user privileges or virtual network configurations.

Figure 1A:
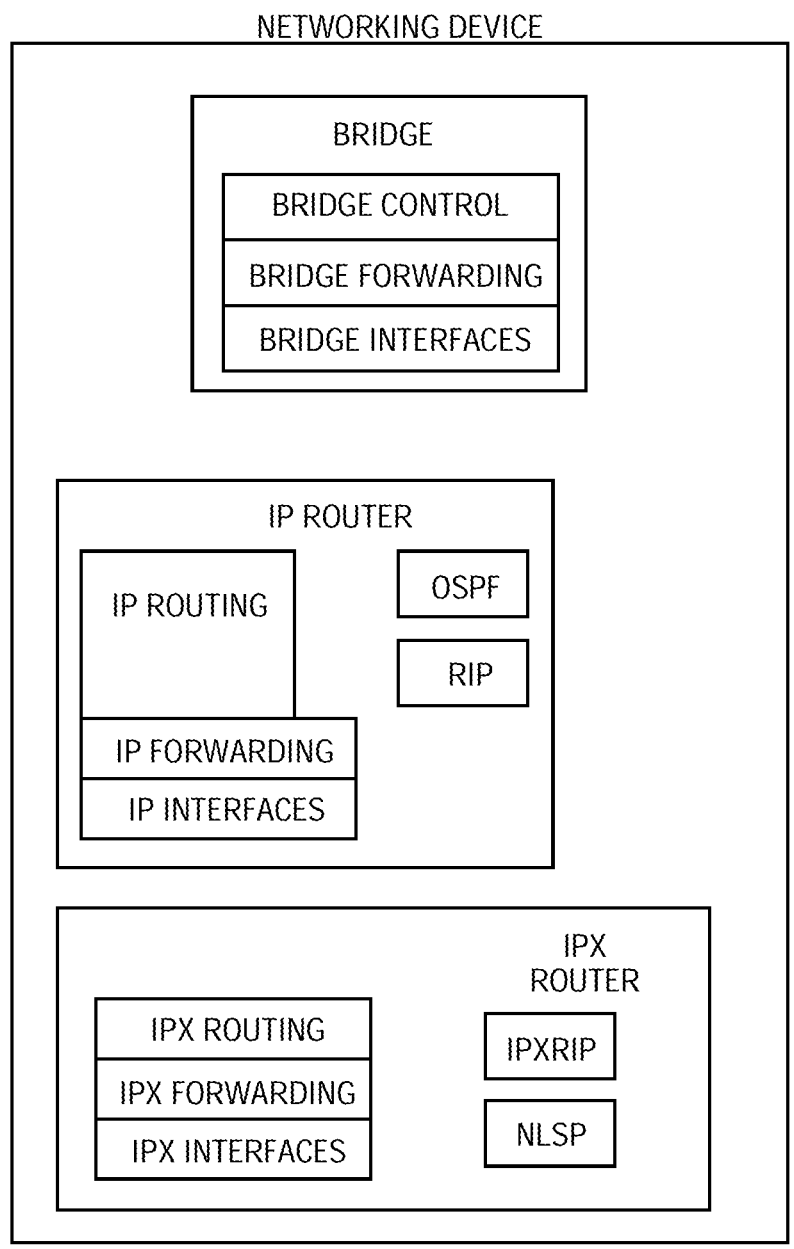
FIG. 1A is a generalized diagram of a multi-protocol bridge/router.
Figure 1B:
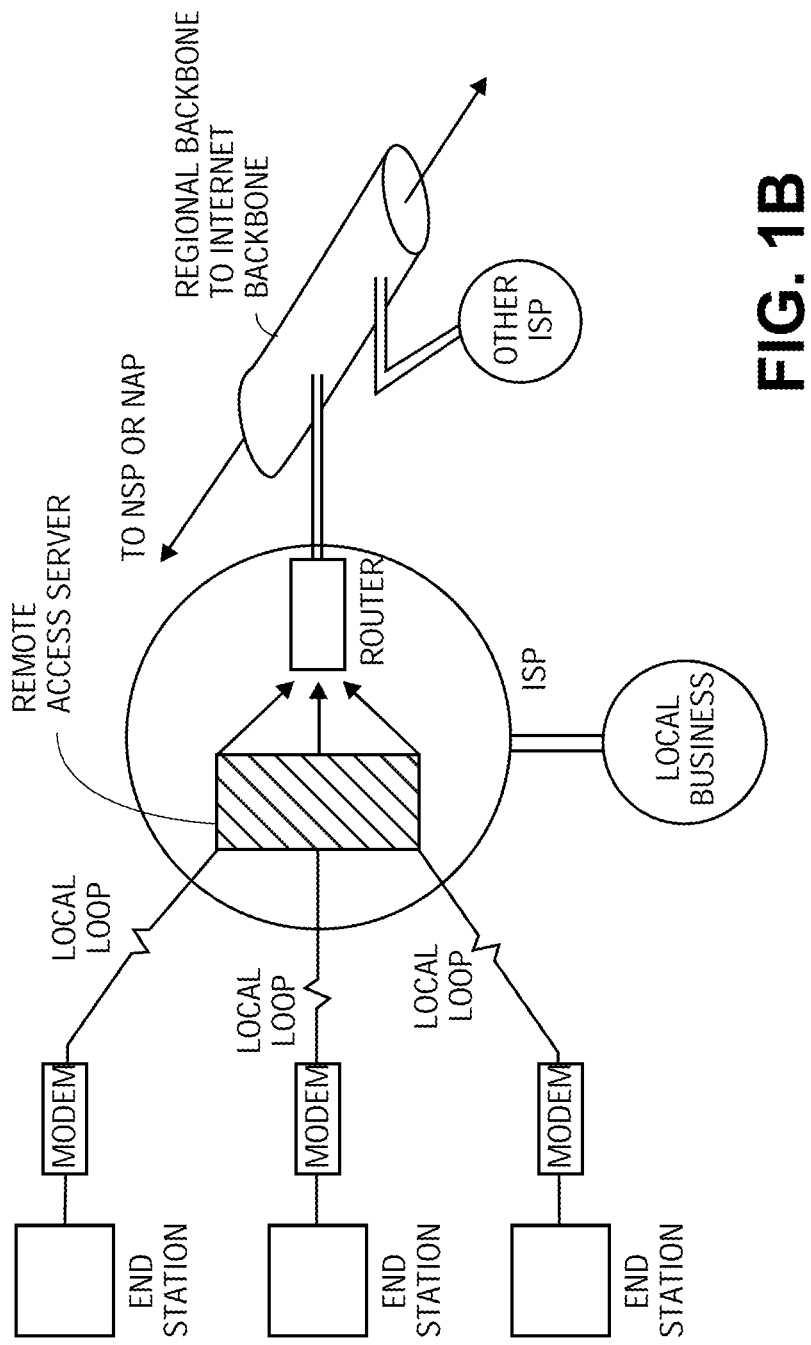
FIG. 1B is an illustrative example of the topology of and connections.
Figure 3:
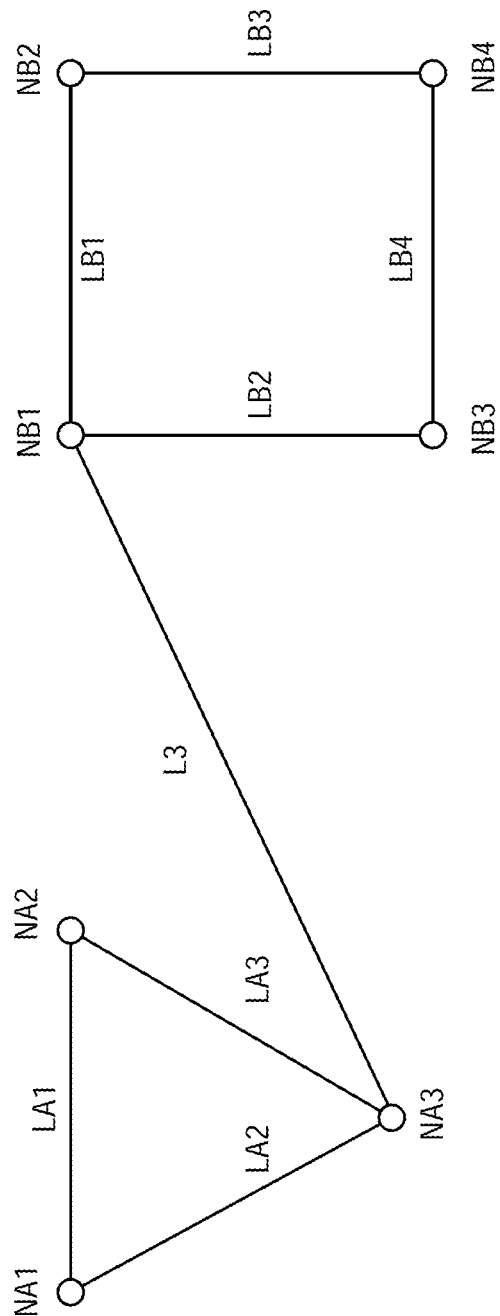
FIG. 3 is a network graph of an illustrative network in which the networks of FIGS. 2A and 2B are joined.
Figure 4:
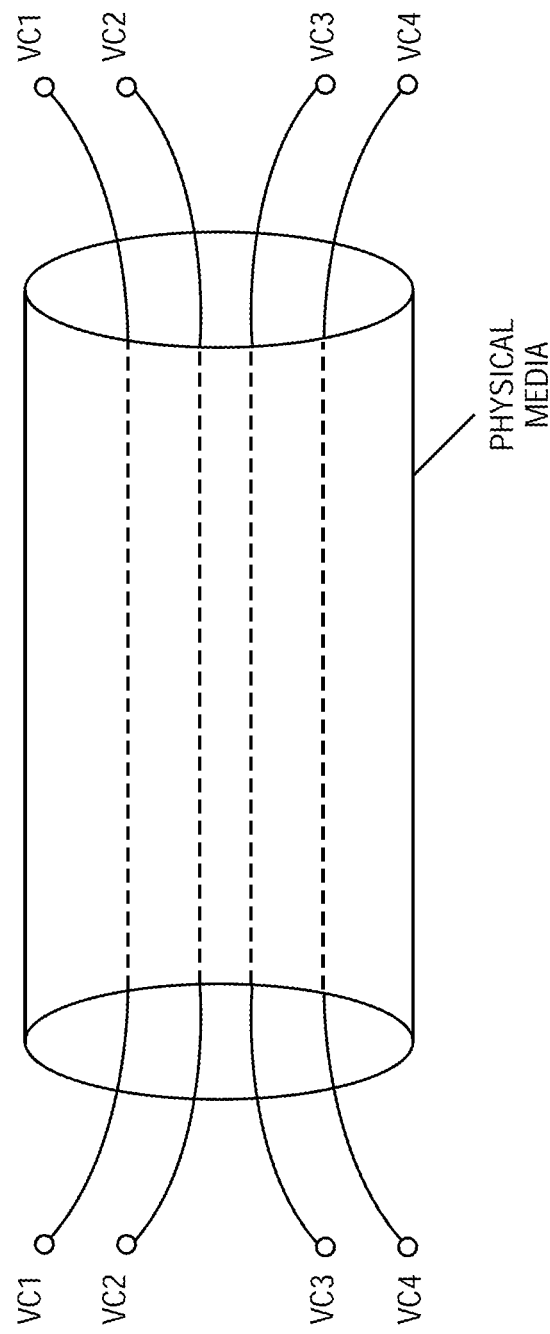
FIG. 4 is an illustrative drawing of a segment of a single physical medium capable of carrying multiple information flows, each in its own virtual circuit (or channel)
Figure 5:
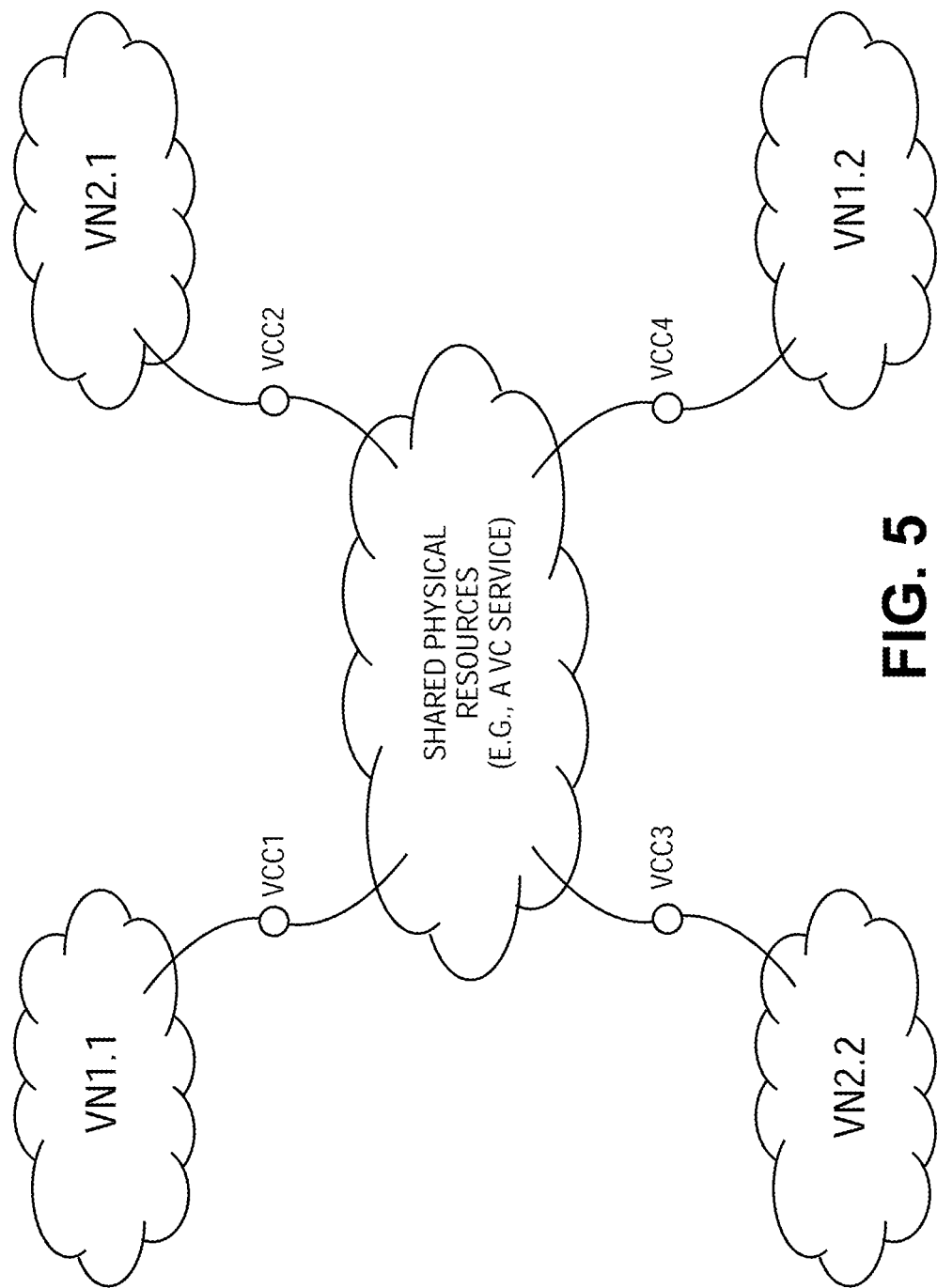
FIG. 5 is an illustrative drawing of two virtual networks each made up of two independent network segments.
Figure 6:
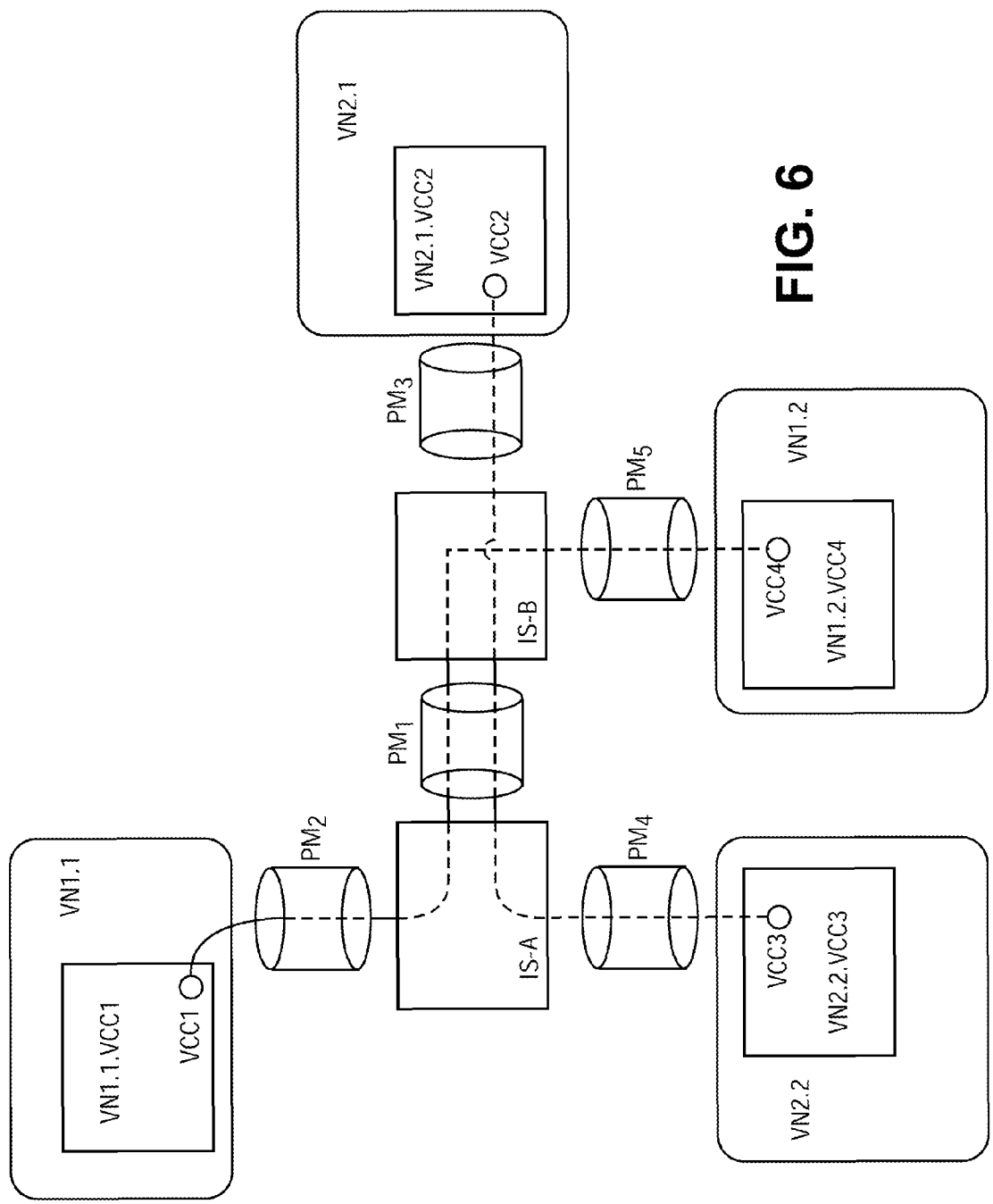
FIG. 6 is an illustrative drawing that provides additional details of some of the physical constituents of the virtual networks of FIG. 5.
Figure 8:
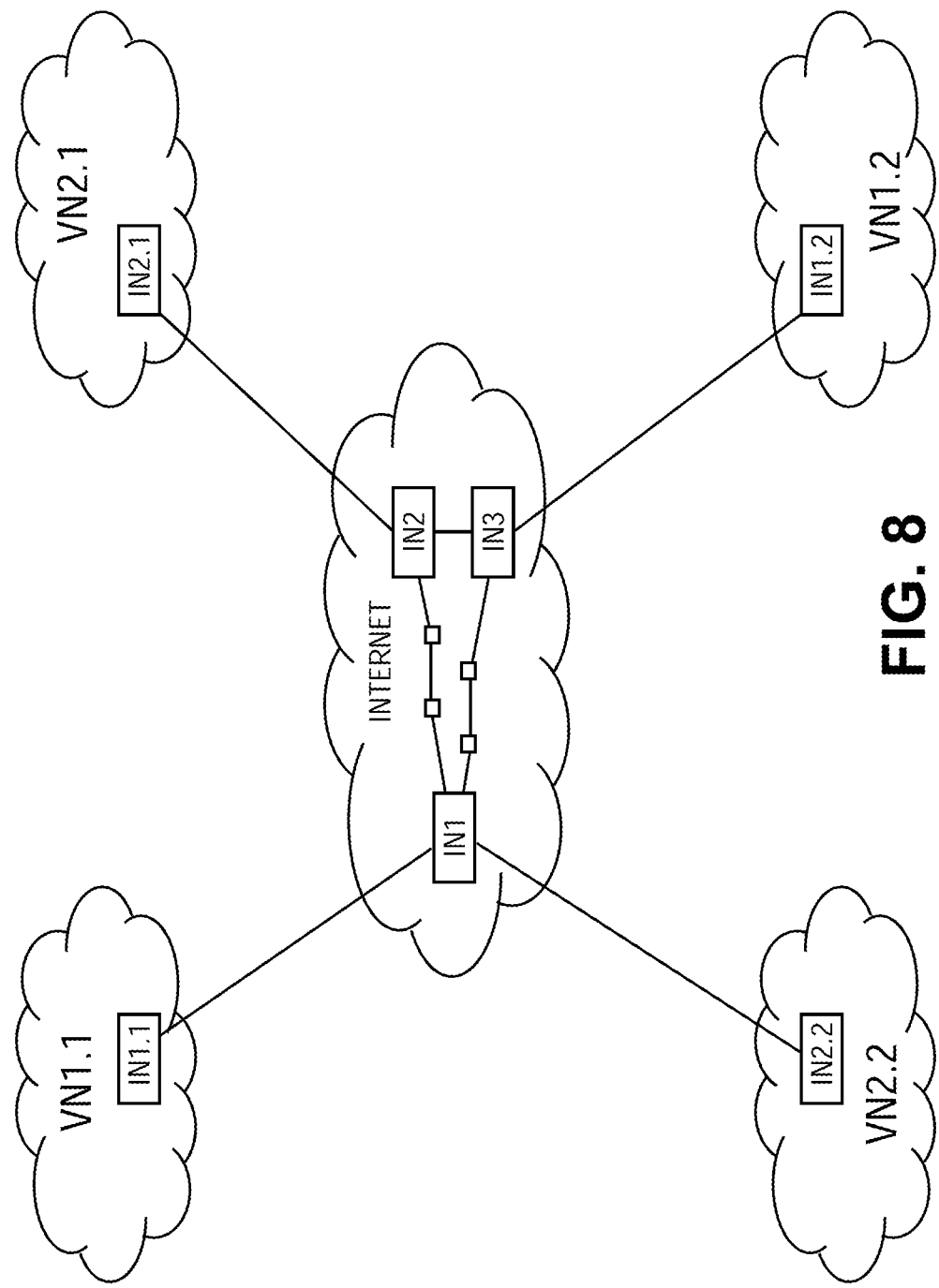
FIG. 8 is an illustrative drawing that shows that the Internet can provide the shared network resources of FIGS. 5 and 6.
Figure 9:
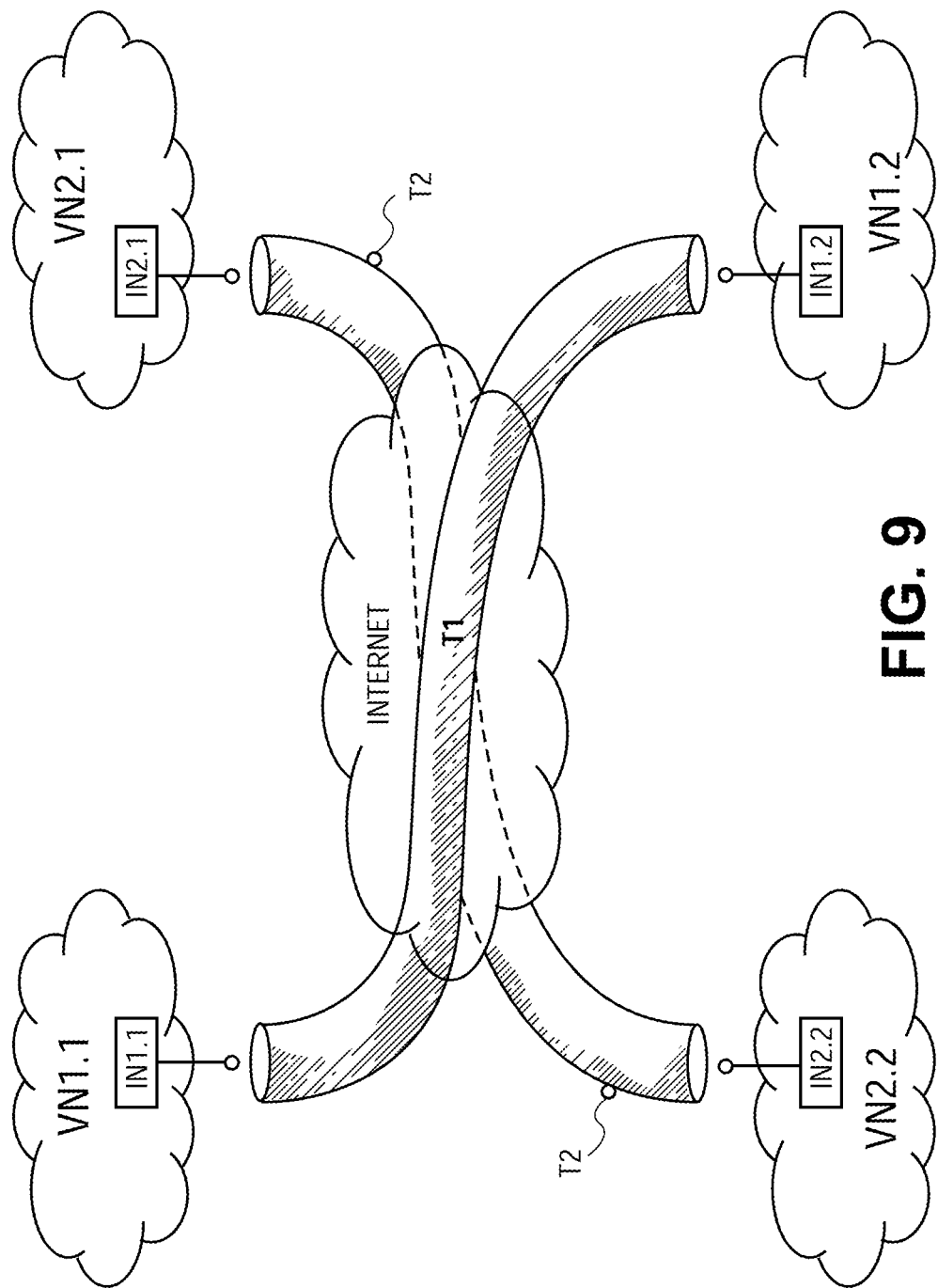
FIG. 9 is an illustrative drawing that shows tunneling through the Internet to provide the shared resources of FIGS. 5 and 6.
Figure 12:
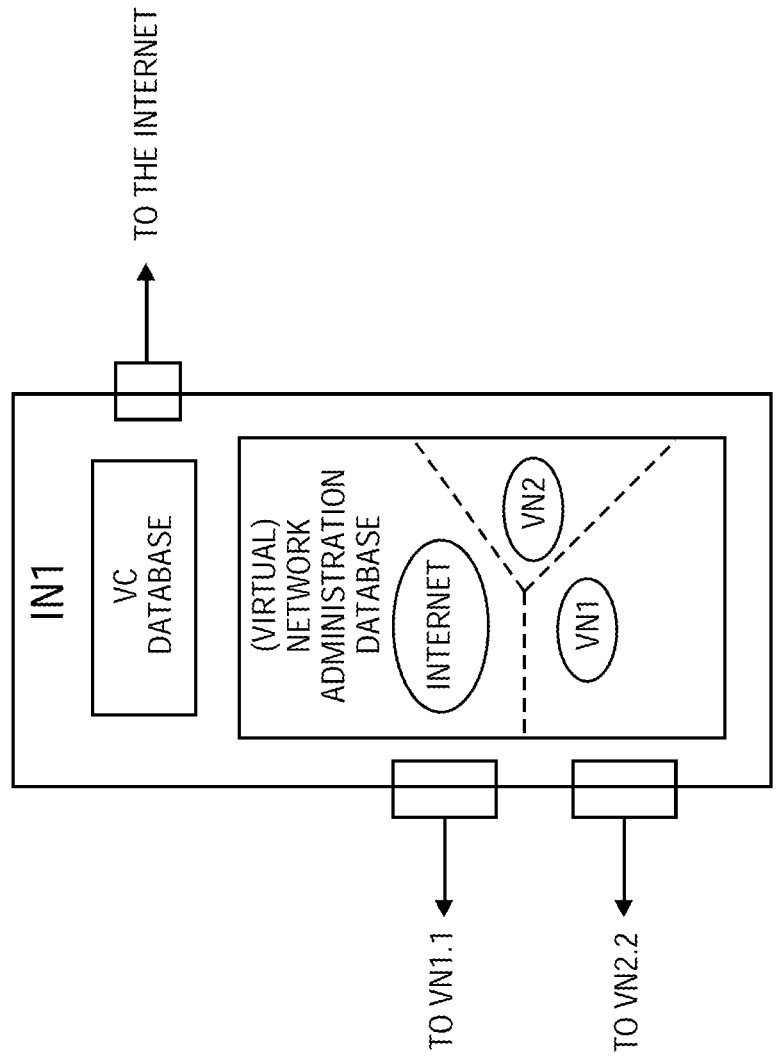
FIG. 12 is a conceptual drawing of one possible router configuration that can be used to implement intermediate node IN1 of FIG. 7.
Figure 11:
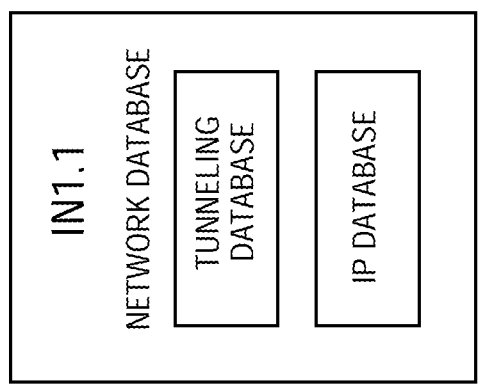
FIG. 11 is a generalized illustrative drawing of the organization of node IN1 to achieve tunneling.
Figure 13:
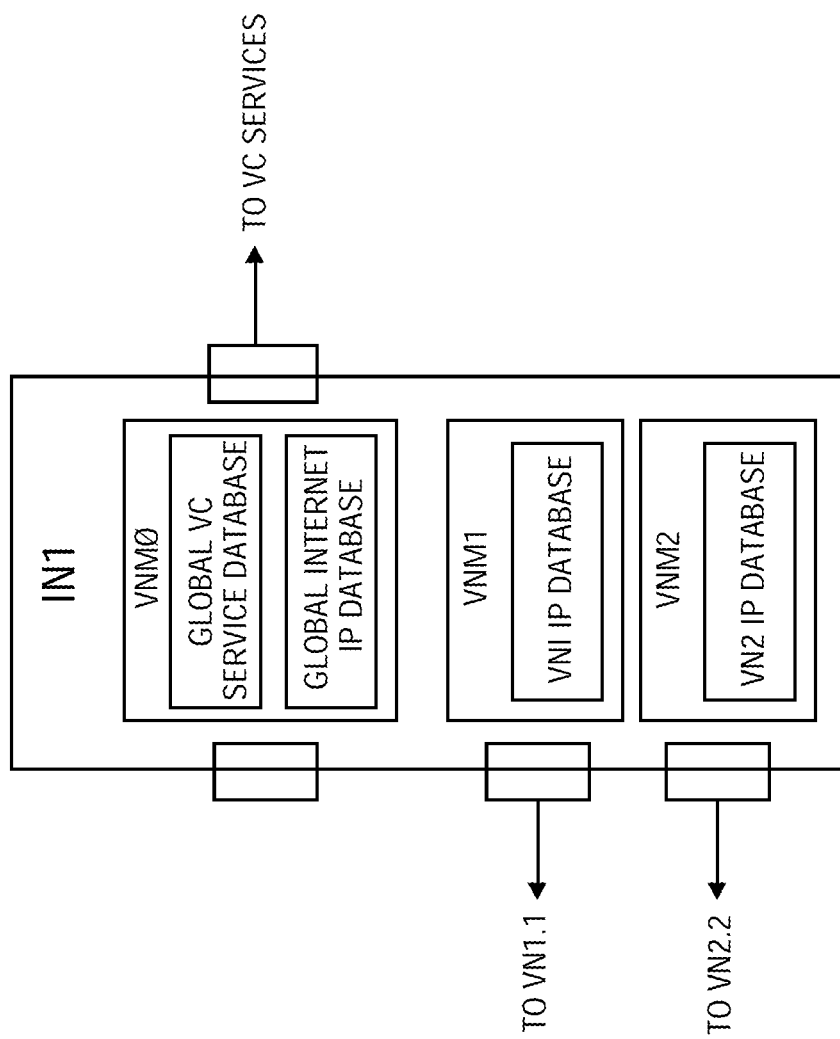
FIG. 13 is a generalized block diagram of a network device that instantiates multiple virtual network machine routers in electronic memory in accordance with one embodiment of the invention.

Referring to the illustrative drawing of FIG. 13, there is shown a generalized block diagram of a new structure for the network database of node IN1 from FIGS. 8 and 12 in accordance with one embodiment of the invention that supports creation of multiple virtual network machines. In this case, the networks device IN1 supports three virtual network machines VNMO, VNM1 and VNM2. In the embodiment of FIG. 13, assuming again that all three virtual networks operate using the IP protocol, each virtual network machine implements the functionality of an IP router, each operating in its own network domain. Each virtual network machine is allocated a portion of the device's native resources. Each virtual network machine runs the IP protocol stack. Each virtual network machine stores its address, policy and control information separately from the others. Thus, each virtual network machine can operate independently of the other virtual network machines, even though it shares native computer resources with the other virtual network machines. This virtual network machine based organization of information therefore provides greater isolation between network domains.

Each virtual network machine has its own network database that contains its control information. VNM0 has a network database that causes it to operate as a router that routes information within the Internet network domain. VNM1 has a network database that causes it to operate as a router that routes resource information within network domain VN1. VNM2 has a network database that causes it to operate as a router that routes resource information within network domain VN2.1. High Speed Networks, TCP/IP and ATM Design Principles, by William Stallings, Prentice Hall, 1998 provides detailed discussion of router functions and the functions of other network devices.

The VNMs of FIG. 13 may employ multiple different kinds of layer 1 (physical) media to attach to one or more networks. In a presently preferred embodiment, these physical connections include ATM OC-3c/STM1, ATM DS-3/E3, DS-3 Clear Channel, HSSI and 10/100 Base-2 T TX. Resource information is transmitted across these physical connections such as phone lines, DSL or ADSL for example to and from VNM0, VNM1 and VNM2 using layer 2 (data link) protocols. There are layer 2 LAN (local area network) technology and layer 2 WAN (wide area network) technology protocols. Examples of LAN technologies include Ethernet and IEEE 802.3, Fast Ethernet, Token Ring and Fiber Distributed Data Interface. Examples of WAN technologies include Asynchronous Transfer Mode (ATM), Frame Relay, X.25, Point-to-Point (PPP), Integrated Services Digital Network (ISDN) and High-Level Data Link Control (HDLC). Intermediate stations communicate with each other using layer 3 protocols. Layer 3 protocols include Internet Protocol (IP), AppleTalk and Inter Packet Exchange (IPX). Thus, for example, VNM0, VNM1 and VNM2 each employ one or more layer 3 protocols to communicate with other stations of the network(s) to which they are attached.

Thus, the three virtual network machines and the different network domains associated with them are isolated from each other in the network device intermediate station of FIG. 13, and the task of exercising administrative control can be simplified significantly. Since there is no monolithic database that must be maintained to control information transfers across all of the networks to which the three VNMs are attached, the task of administering each database is simplified.

The virtual network machine based organization also simplifies the administration, lowering the cost of operating all three networks. The organization of information along network domain boundaries eliminates the notion of information from two domains residing under a single monolithic structure, and thereby eliminates the need to define inter-domain policies to manage the separation of information within a monolithic database structure. The separation policy mechanisms represented by the dotted lines cutting through the database of FIG. 12 are gone, and a whole set of administrative chores disappears with them. There will be no need to define the complicated inter-domain policies, and no cost associated with administering them. The amount of information that needs to be configured by the administrators is greatly reduced in size and complexity using this method of database organization.

Other benefits can be realized through greater efficiencies in the implementation of such network devices that are possible with this method of network database organization. Further efficiencies are realized through the elimination of the complicated inter-domain policies in virtually all functions of the device. Essentially, each of the virtual network machines VNM0, VNM1 and VNM2 operates a separate/independent network device, performing networking functions its own domain.

Dynamic Binding

Figure 14:
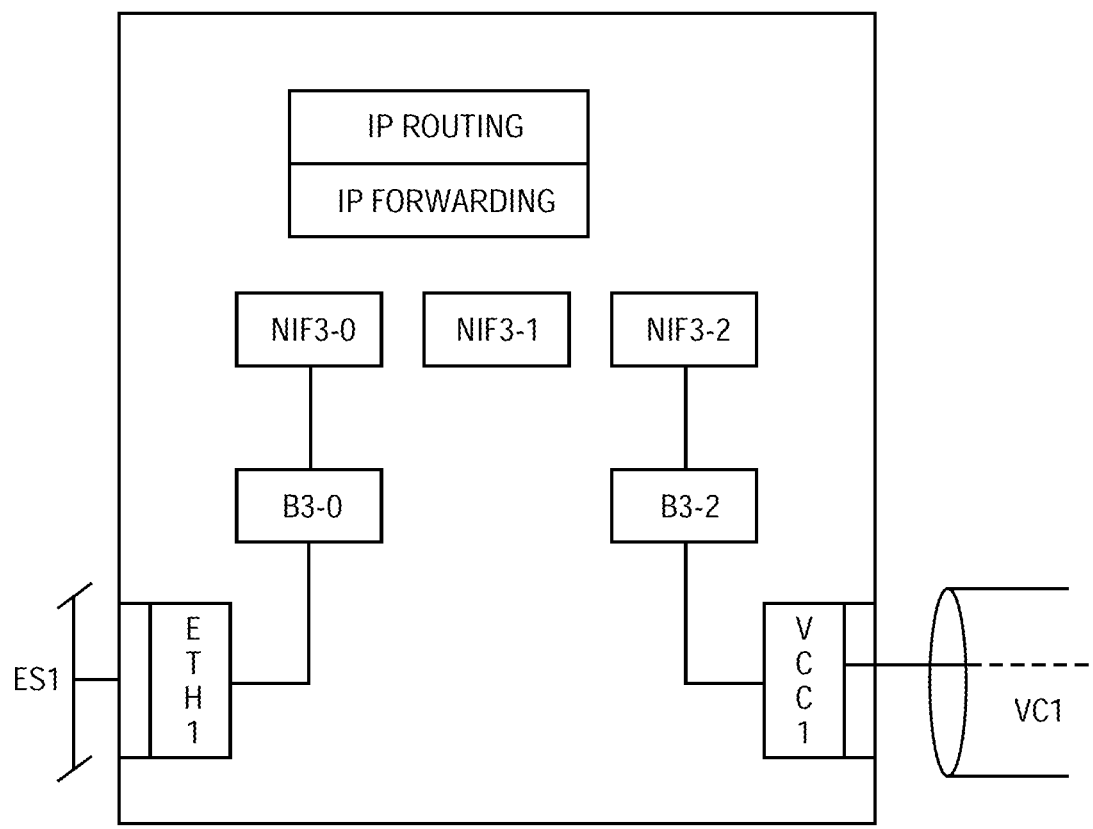
FIG. 14 is a generalized block diagram of a network device that instantiates a virtual network machine with multiple layer 2 sub-interface data structures and multiple layer 3 interfaces and binding data structures that associate layer 2 sub-interface data structures and layer 3 interfaces.

The drawing of FIG. 14 shows another illustrative embodiment of the invention. The IP network device of FIG. 14 implements a router that includes three network interfaces NIF3-0, NIF3-1 and NIF3-2. The network device also has a layer 1/2 connection to art Ethernet service. The network device also has a layer 1/2 connection to a virtual circuit service. An Ethernet service sub-interface data structure Eth1 provides the layer 2 Ethernet connection such as sub-interface data structure provides the layer 2 VCC1 connection. For example, the VCC1 sub-interface data structure of FIG. 14 may be kept in a table that identifies all virtual circuit connections, each defining the encapsulation protocol, the packet or cell, data compression technique and the particular layer 2 protocol used on that circuit. The Ethernet sub-interface data structure may include the Ethernet address of the local connection and other parameters to control transmit and receipt of information on the Ethernet segment. A binding data structure B3-0 binds the Ethernet sub-interface data structure to NIF3-0. A binding data structure B3-2 binds the VCC1 sub-interface data structure to NIF3-2. The Ethernet and VCC1 sub-interface data structures are labeled with the prefix "sub" because they are layer 2 constructs which are below the layer 3 interface constructs in the ISO scheme.

Referring to FIG. 14, binding data structure B3-0 establishes a layer 2/3 connection between the Ethernet sub-interface data structure and NIF3-0, and binding data structure B3-2 establishes a layer 2/3 connection between VCC1 sub-interface data structure and IF3-2. Binding data structure B3-0 causes information transferred across the Ethernet connection to be processed through to NIF3-0. An IP Forwarding/Routing database controls routing of the information out the correct interface. Binding data structure B3-2 causes the information transferred across the VCC1 connection to be processed through NIF3-2.

The VCC1 sub-interface data structure instantiates a virtual circuit connection to the network device of FIG. 14. A virtual circuit connection such as that in FIG. 14 can be created in accord with any of several technologies. A sub-interface data structure like that in FIG. 14 stores the network device's identity of the virtual circuit attached to it. Many virtual circuits can be established across a single physical connection, and many virtual circuits can be connected to a single network device.

Figure 15:
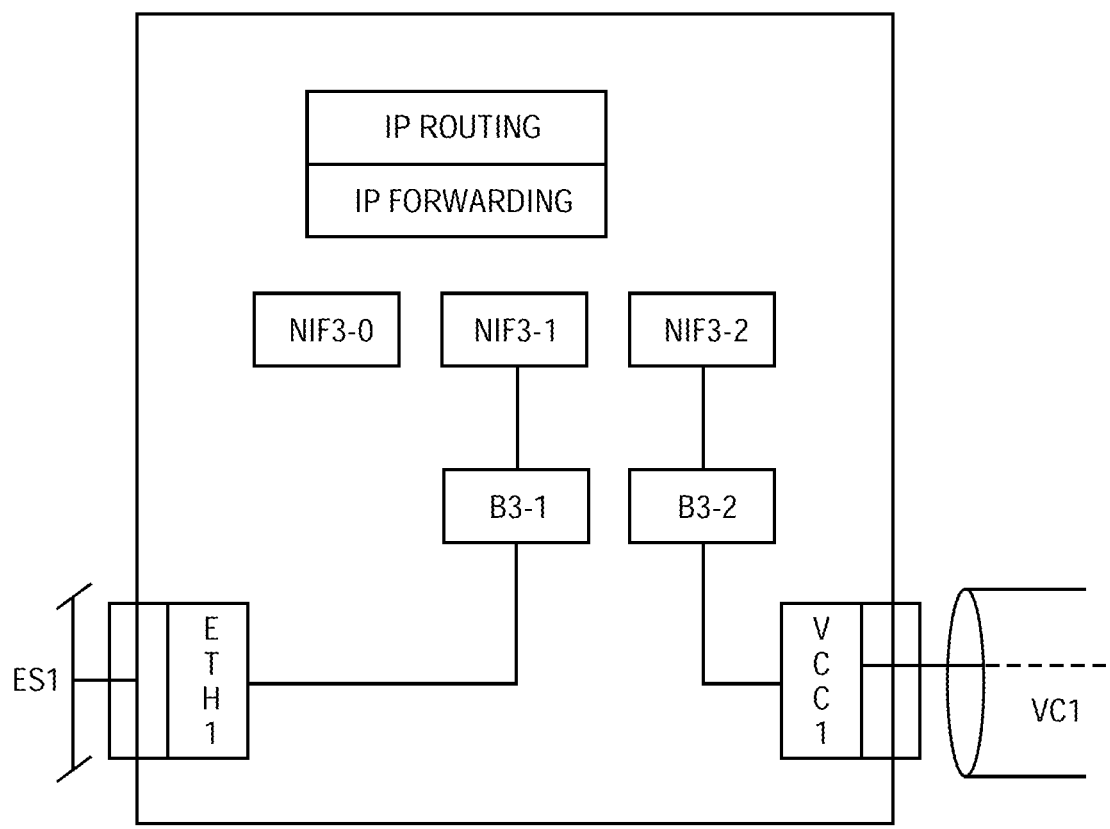
FIG. 15 is a generalized block diagram of the network device of FIG. 14, except that one binding data structure has been removed and another binding data structure has been created.

FIG. 15 depicts the same intermediate station as in FIG. 14, except the binding B3-0 has been eliminated, and binding B3-1 has been created. Binding B3-1 associates the Ethernet sub-interface data structure Eth-1 with interface NIF3-1. Interface NIF3-2 remains bound to the sub-interface data structure VCC1. The interface NIF3-0 is not bound to any layer 2 construct. It should be noted that an unbound interface construct generally would represent a mis-configuration in a typical earlier intermediate station.

Figure 16:
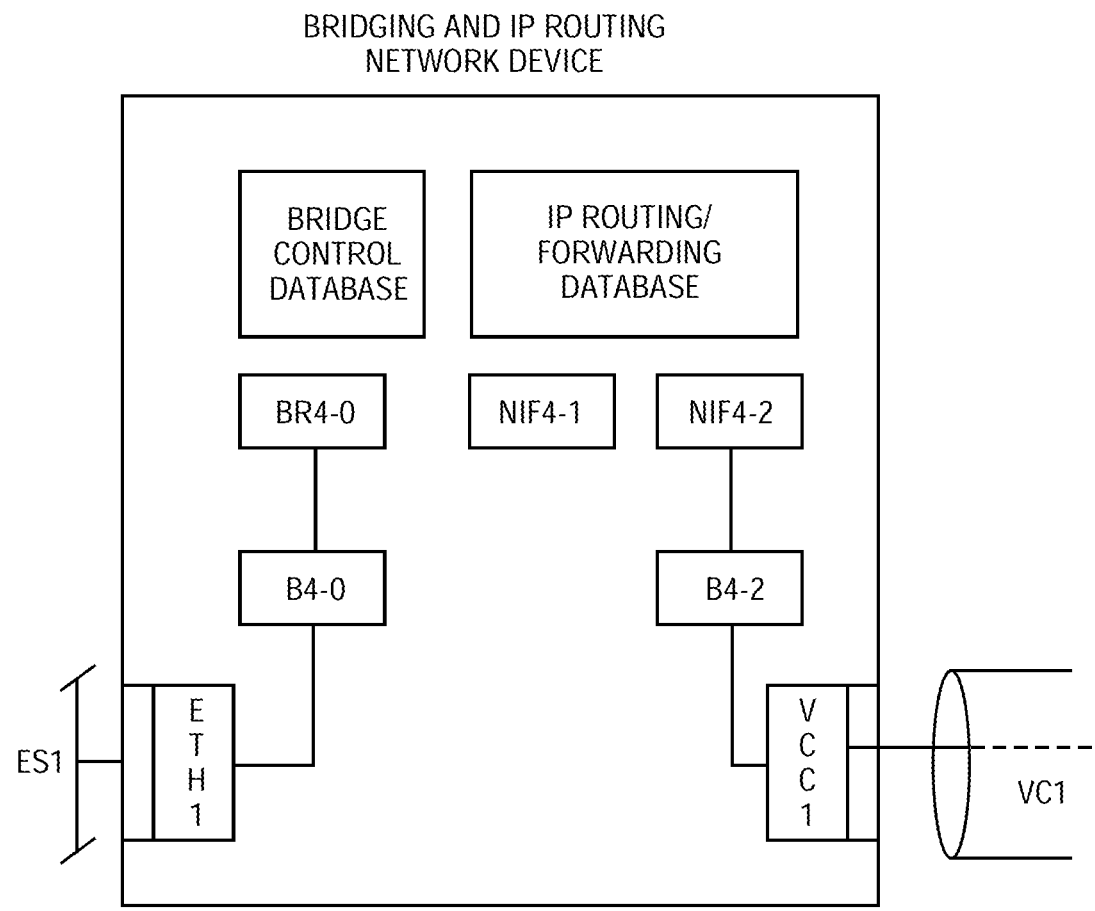
FIG. 16 is a generalized block diagram of a network device that implements a virtual network machine router and a virtual network machine bridge.

FIG. 16 depicts yet another illustrative embodiment of the invention. The network device of FIG. 16 implements an IP router function and a bridging function. The router includes two interfaces NIF4-1 and NIF4-2. The bridge includes a bridge interface BR4-0. A network database that implements the bridge function includes a list of network stations reachable through each of the bridge's interfaces. The network device also has a layer 1/2 connection to an Ethernet service. The network device also has a layer 1/2 connection to a virtual circuit service VCC1. An Ethernet service sub-interface data structure Eth1 provides information concerning the Ethernet connection such as a VCC1 sub-interface data structure provides information concerning the VCC1 connection. A binding data structure B4-0 binds the Ethernet sub-interface data structure to NIF4-0. A binding data structure B4-2 binds the VCC1 sub-interface data structure to NIF4-2. NIF4-1 is unbound.

Figure 17:
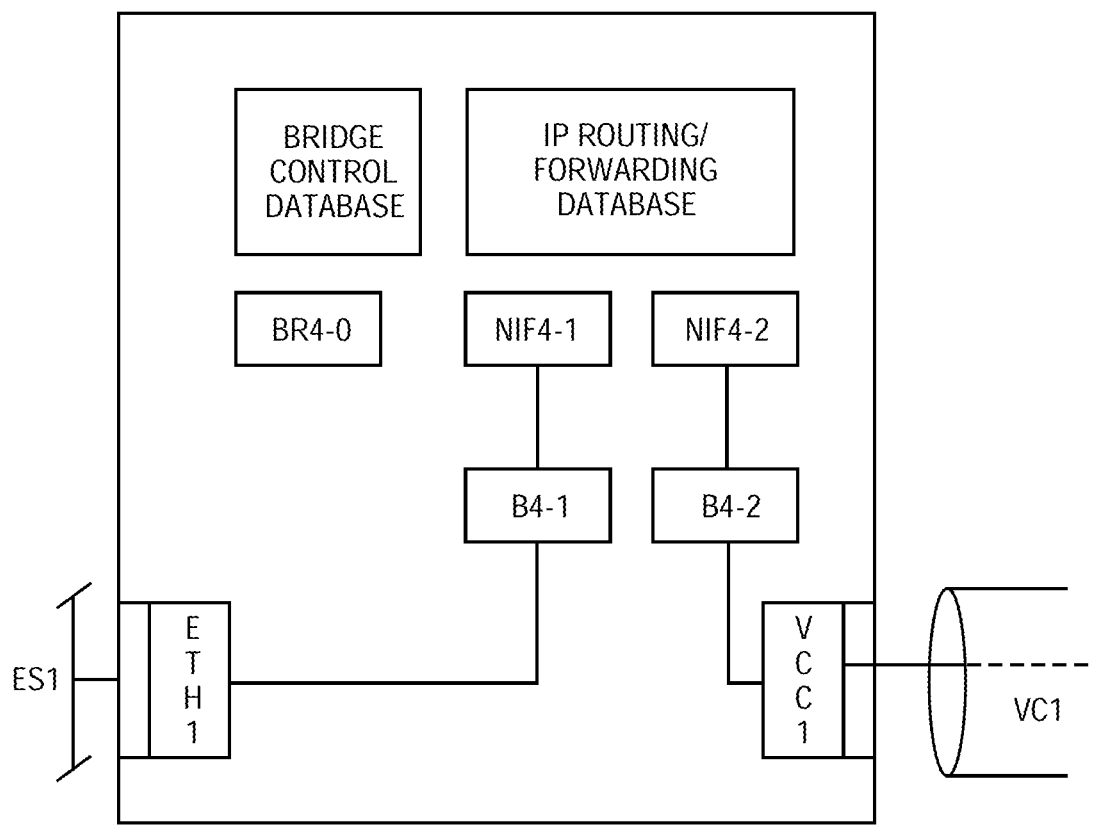
FIG. 17 is a generalized block diagram of the network device as in FIG. 16, except that one binding data structure has been removed and another binding data structure has been created.

FIG. 17 depicts the same network device as in FIG. 16, except the binding B4-0 has been eliminated, and binding B4-1 has been created. Binding B4-1 associates the Ethernet sub-interface data structure with interface NIF4-1 of virtual router VM4. Interface NIF4-2 remains bound to the sub-interface data structure VCC1. The interface BR4-0 is not bound to any layer 2 construct. These changes in binding effectively redefines the service available on the Ethernet segment from a bridged or layer 2 service, to a routed or layer 3 service. In a presently preferred embodiment of the invention, these bindings can be changed without reconfiguration of any other interface construct or circuit construct. In a typical earlier intermediate station, the bindings between the higher and lower layers are implicit, and a change in the implicit bindings applied to the bridge and router interface constructs typically would have required a modification of these interface constructs. A present embodiment of the invention does not require such modification.

Figure 18:
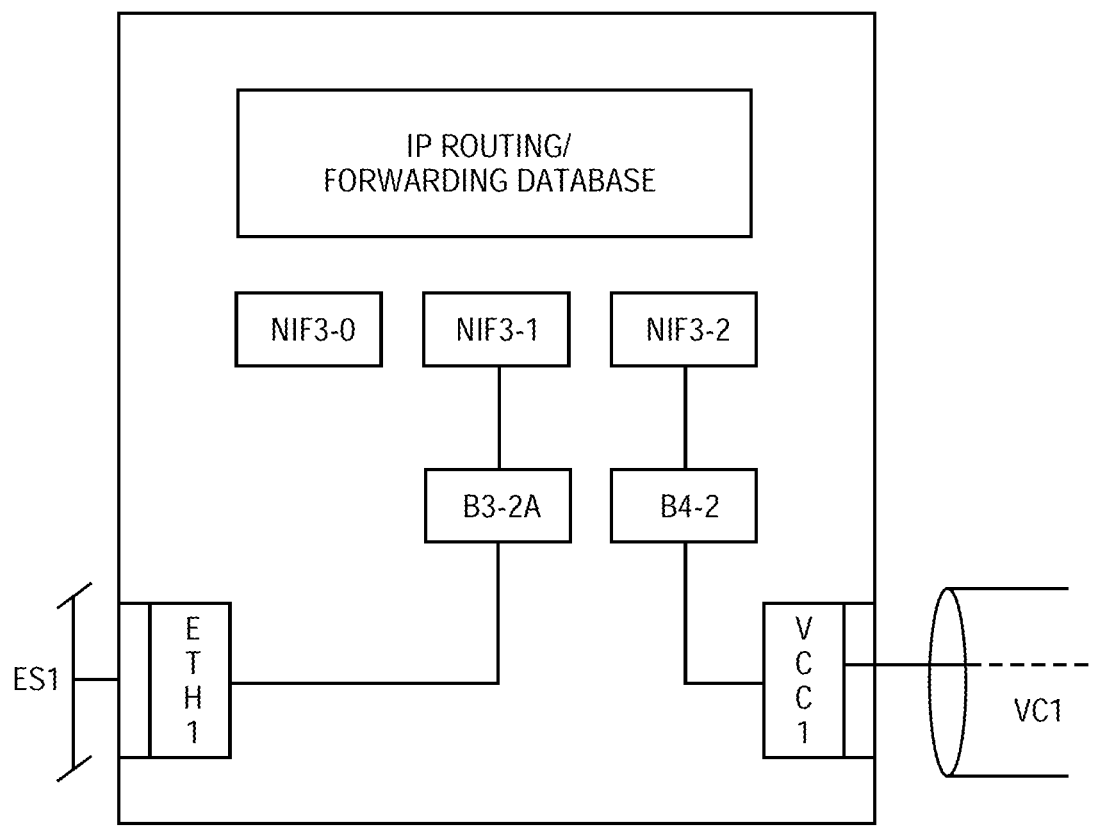
FIG. 18 is a generalized block diagram of the network device of FIG. 14, except that one binding data structure has been eliminated and another binding data structure has been created.

FIG. 18 depicts the same network device as in FIG. 14, except the binding B3-0 has been eliminated and binding B3-2A has been created. Binding B3-2A associates the Ethernet sub-interface data structure with the NIF3-2 interface. Binding B4-2 associates the VCC1 sub-interface data structure with NIF3-2. Interfaces NIF3-0 and NIF3-1 are unbound. This change in bindings causes both the Ethernet and the virtual circuit lower layer services to be associated with a single higher layer IP construct, NIF3-2.

Figure 19:
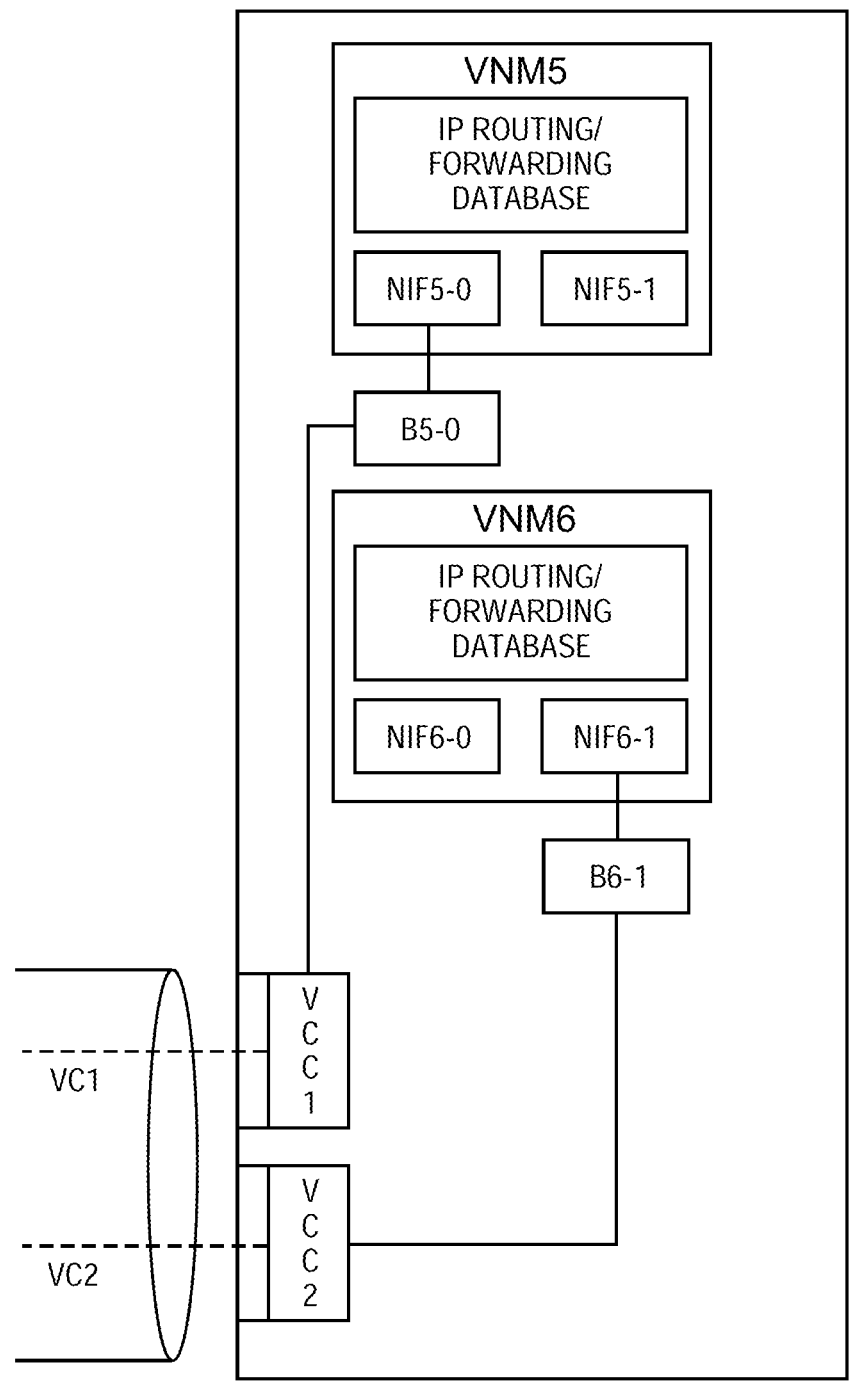
FIG. 19 is a generalized block diagram of a network device which comprises a computer which instantiates multiple virtual network machines in accordance with an embodiment of the invention.

FIG. 19 shows a network device which comprises a computer which instantiates multiple virtual network machines VNM5 and VNM6. VNM5 implements IP router functionality. It includes network interfaces NIF5-0 and NIF5-1. VNM6 also implements IP router functionality. It includes two interfaces NIF6-0 and NIF6-1. The network device of FIG. 19 has two layer 1/2 connections to a virtual circuit service. Sub-interface data structure VCC1 instantiates one of the connections to the device. Sub-interface VCC2 instantiates the other connection to the device. A binding data structure B5-0 binds the VCC1 sub-interface data structure to NIF5-0 of VNM5. A binding data structure B6-2 binds the VCC2 sub-interface data structure to interface NIF6-1 of VNM6. VNM5 and VNM6 each use the IP protocol suite to communicate with other stations of the network(s) to which they are attached.

Figure 20:
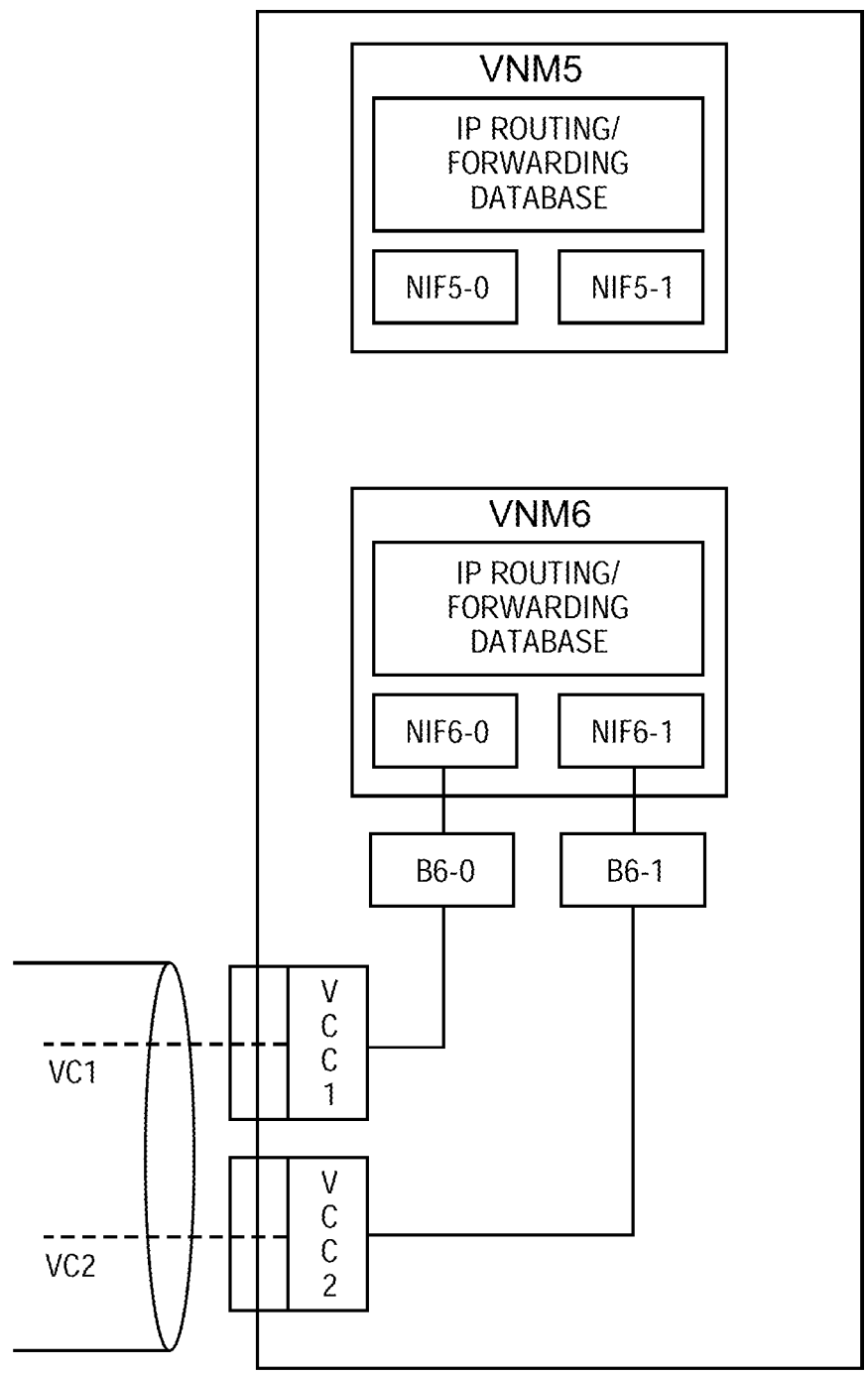
FIG. 20 is a generalized block diagram of the network device of FIG. 19 except that one binding data structure has been removed and another binding data structure has been created.

FIG. 20 depicts the same network device as in FIG. 19, except the binding B5-0 has been eliminated and binding B6-0 has been created. The binding B6-0 data structure associates VCC1 sub-interface data structure with NIF6-0 of VNM6. Binding data structure B6-1 binds sub-interface data structure VCC2 to NIF6-1. Neither of the VNM5 interfaces NIF5-0 and NIF5-1 are bound.

In FIGS. 14 to 20, bindings are shown as data structures connected to other data structures by line segments. In one preferred embodiment, the line segments each represent a pair of bi-directional pointers; the first pointer points from the binding to the higher or lower layer data structures and the second is opposite the first, pointing from the higher or lower layer data structure to the binding data structure. Alternatively, the binding could be implemented as indices or identifiers in a table, for example. Dynamic binding is accomplished by creating and/or deleting binding data structures and/or changing the values of the pointers or indices so they operate on different data structures. It will be appreciated that actual changing of the bindings can be accomplished through entries in a command line interface to the network device or automatically by snooping the information flow through the device, for example.

Figure 21:
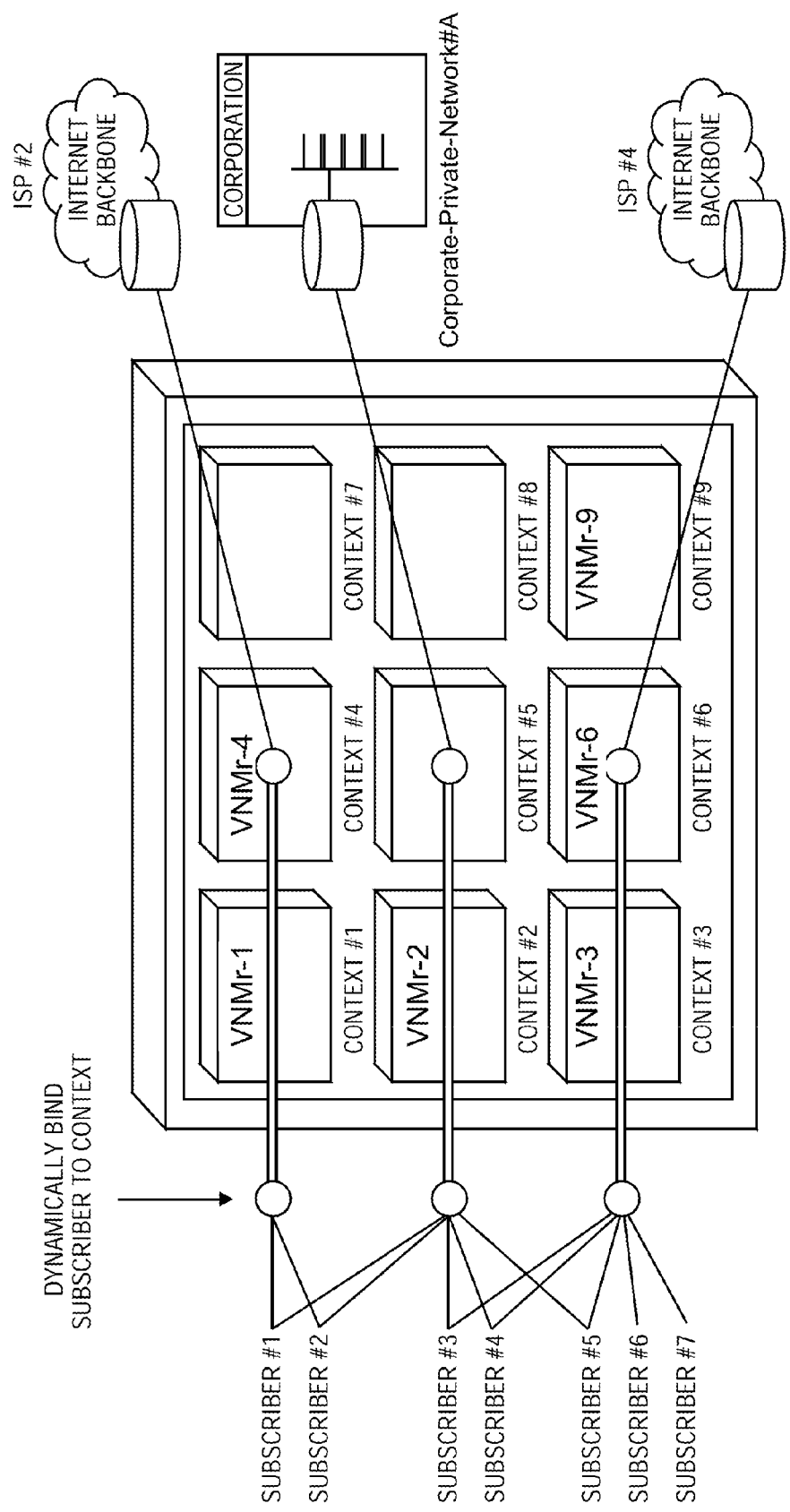
FIG. 21 is a generalized block diagram of a subscriber management system in accordance with a presently preferred embodiment of the invention.

The illustrative drawing of FIG. 21 is a generalized block diagram of a subscriber management system in accordance with a presently preferred embodiment of the invention. A subscriber is a user of network services. The system includes a computer with layer 1/2 connections to subscriber end stations and with layer 1/2 connections to network devices that provide access to other networks.

The system can form a multiplicity of layer 1/2 subscriber end station connections. In a present embodiment, the layer 1/2 connections to subscriber end stations include virtual circuit connections. The system memory stores a multiplicity of sub-interface data structures that instantiate the multiplicity of virtual circuit connections through which subscriber end stations communicate with the subscriber management system.

The system instantiates in memory a plurality of virtual network machines. Each VNM of the embodiment of FIG. 21 implements the functionality of a router. There are nine illustrative VNM routers shown in FIG. 21 labeled VNMr-1-VNMr-9. Each VNM router includes interfaces in its database. Each VNM router runs at least one layer 3 protocol suite. Each VNM router may run one or more adaptive routing algorithms. The interfaces of each VNM router provide access to a network that is isolated from the networks accessed through the interfaces of the other VNM routers. For example, the interface to VNMr-4 provides layer 3 access to the network that includes ISP#2. The interface to VNMr-5 provides layer 3 access to the network that includes Corporate-Private-Network#A. The interface to VNMr-6 provides layer 3 access to the network that includes ISP#4. The networks with ISP#2, Corporate-Private-Network#A and ISP#4 are isolated from each other. The databases associated with VNMr-4, VNMr-5 and VNMr-6 to control access to networks across these respective interfaces. Each of these three VNM databases can be administered separately. In operation a subscriber might establish a point-to-point connection with the subscriber management system. A server that runs software that runs authentication, authorization and accounting protocols (AAA) searches for a record that identifies the user. Authentication is the process of identifying and verifying a user. For instance, a user might be identified by a combination of a username and a password or through a unique key. Authorization determines what a user can do after being authenticated, such as gaining access to certain end stations information resources. Accounting is recording user activity. In the present embodiment, AAA involves client software that runs on the subscriber management system and related access control software that runs either locally or on a remote server station attached to the network. The present embodiment employs Remote Authentication Dial-In User Service (RADIUS) to communicate with a remote server. An example of an alternative AAA protocol is Terminal Access Controller Access Control System Plus (TACACS+). RADIUS and TACACS+ are protocols that provide communication between the AAA client on a router and access control server software.

The subscriber record includes information concerning the network to which the subscriber's virtual circuit connection should be bound. Typically, the subscriber will employ a PVC. Based upon the information in the subscriber record, a binding data structure, like that described in reference to FIGS. 14 to 20, will be created to associate the sub-interface data structure that instantiates the PVC in the subscriber management system memory with the interface to the VNM router that accesses the network identified for the subscriber in the subscriber record.

Moreover, the subscriber record may provide multiple possible binding options for the subscriber. For instance, the subscriber may specify the creation of a binding that is which is to be employed during business hours and which binds the subscriber to VNMr-5 which provides layer 3 network access to the Corporate-Private-Network#A. The same record may specify another binding which is to be employed only during non-business hours and which binds to VNM#4 which provides layer 3 network access to ISP#2. Thus, the bindings can be changed. They are dynamic.

Various modifications to the preferred embodiments can be made without departing from the spirit and scope of the invention. Thus, the foregoing description is not intended to limit the invention which is described in the appended claims in which:

What is claimed is:

1. A method performed by a single network device communicatively coupled with a plurality of end stations, comprising:
   authenticating, using an authentication, authorization and accounting (AAA) protocol, a plurality of users based upon a plurality of records, wherein the plurality of users utilize the plurality of end stations, wherein each of the plurality of records comprises information indicating which of a plurality of virtual routers the respective end station is to be currently coupled to, wherein the single network device comprises the plurality of virtual routers that share a set of physical resources of the single network device, and wherein each of the plurality of virtual routers belongs to a different one of a plurality of virtual private networks; and
   communicatively coupling, within the single network device, different ones of the plurality of end stations with different ones of the virtual routers based on the information obtained using the AAA protocol during said authenticating.

2. The method of claim 1, further comprising:
   routing packets for the plurality of end stations via the respective virtual routers using a plurality of network databases, wherein each of the plurality of network databases belongs to a different one of the plurality of virtual routers.

3. The method of claim 2, further comprising:
   causing an accounting, using the AAA protocol, for the network activity of each of the plurality of users.

4. The method of claim 1, wherein the AAA protocol is Remote Authentication Dial In User Service (RADIUS) protocol.

5. The method of claim 4, wherein said authenticating comprises communicating with a remote server using the RADIUS protocol.

6. The method of claim 1, wherein said communicatively coupling comprises associating the different ones of the plurality of end stations with the different ones of the virtual routers within a binding data structure.

7. The method of claim 1, wherein said routing of packets for the plurality of end stations further utilizes a plurality of tunneled connections.

8. A single network device, comprising:
   a set of one or more processors;
   communications hardware to transmit and receive packets to and from a plurality of end stations; and
   a non-transitory computer-readable medium having stored therein a set of instructions that, when executed by the set of processors, cause the single network device to,
      create a plurality of virtual routers that will share a set of physical resources of the single network device, wherein each of the plurality of virtual routers is to belong to a different one of a plurality of virtual private networks,
      authenticate, using an authentication, authorization and accounting (AAA) protocol, users based upon a plurality of records, wherein the plurality of users utilize the plurality of end stations communicatively coupled with the single network device, wherein each of the plurality of records is to comprise information to indicate which of the plurality of virtual routers the respective end station is to be coupled to, and
      communicatively couple, within the single network device, different ones of the plurality of end stations with different ones of the virtual routers based on the information that is to be obtained using the AAA protocol during said authenticating.

9. The single network device of claim 8, wherein the set of instructions further cause the single network device to:
   route packets for the plurality of end stations via the respective virtual routers according to a plurality of network databases of the virtual routers.

10. The single network device of claim 9, wherein the set of instructions further cause the single network device to:
    cause an accounting, through use of the AAA protocol, of network activity for each of the plurality of users.

11. The single network device of claim 8, wherein the AAA protocol is Remote Authentication Dial In User Service (RADIUS) protocol.

12. The single network device of claim 11, wherein the set of instructions cause the single network device to authenticate users based upon the plurality of records by communicating with a remote server using the RADIUS protocol.

13. The single network device of claim 8, wherein the set of instructions cause the single network device to communicatively couple the different ones of the plurality of end stations with the different ones of the virtual routers by associating the different ones of the plurality of end stations with the different ones of the virtual routers within a binding data structure.

14. The single network device of claim 8, wherein the set of instructions cause the single network device to route packets by utilizing a plurality of tunneled connections.

15. A network, comprising:
an Authentication, Authorization, and Accounting (AAA) server that stores a plurality of records, wherein each of the plurality of records is to comprise information to indicate which of a plurality of virtual routers a respective end station of a plurality of end stations is to be coupled to; and
a single network device coupled to the AAA server, wherein the single network device includes,
a set of one or more processors,
communications hardware that transmits and receives packets to and from the plurality of end stations, and
a non-transitory computer-readable medium having stored therein a set of instructions, that, when executed by the set of processors, cause the single network device to,
create the plurality of virtual routers that will share a set of physical resources of the single network device, wherein each of the plurality of virtual routers is to belong to a different one of a plurality of virtual private networks,
authenticate, using an authentication, authorization and accounting (AAA) protocol and the AAA server, the plurality of users based upon the plurality of records, wherein the plurality of users utilize the plurality of end stations communicatively coupled with the single network device, and
communicatively couple, within the single network device, different ones of the plurality of end stations with different ones of the virtual routers based on the information that is to be obtained using the AAA protocol during said authenticating.

16. The network of claim 15, wherein the set of instructions further cause the single network device to:
route packets for the plurality of end stations via the respective virtual routers according to a plurality of network databases of the virtual routers.

17. The network of claim 16, wherein the set of instructions further cause the single network device to:
cause an accounting, through use of the AAA protocol and the AAA server, of network activity for each of the plurality of users.

18. The network of claim 15, wherein the AAA protocol is Remote Authentication Dial In User Service (RADIUS) protocol.

19. The network of claim 15, wherein the set of instructions cause the single network device to communicatively couple the different ones of the plurality of end stations with the different ones of the virtual routers by associating the different ones of the plurality of end stations with the different ones of the virtual routers within a binding data structure.

20. The network of claim 15, wherein the set of instructions cause the single network device to route packets by utilizing a plurality of tunneled connections.

21. A method performed by a single network device communicatively coupled with a plurality of end stations, wherein the single network device comprises a plurality of virtual routers that share a set of physical resources of the single network device, and wherein each of the plurality of virtual routers belongs to a different one of a plurality of virtual private networks, the method comprising:
responsive to an initial communication with an end station of a user, authenticating the user with an Authentication, Authorization, and Accounting (AAA) server to determine information identifying a virtual router of the plurality of virtual routers that the end station of the user is to be coupled to, wherein said authenticating utilizes a Remote Authentication Dial-In User Service (RADIUS) protocol; and
communicatively coupling, within the single network device through a binding data structure, the end station of the user with the virtual router of the plurality of virtual routers based on said determined information.

22. A single network device to implement a plurality of virtual routers that share a set of physical resources of the single network device, wherein each of the plurality of virtual routers belongs to a different one of a plurality of virtual private networks, the single network device comprising:
a set of one or more processors;
communications hardware to transmit and receive packets to and from a plurality of end stations; and
a non-transitory computer-readable medium having stored therein a set of instructions that, when executed by the set of processors, cause the single network device to,
responsive to an initial communication with an end station of the plurality of end stations that is to be utilized by a user, authenticate the user with an Authentication, Authorization, and Accounting (AAA) server to determine information that identifies a virtual router of a plurality of virtual routers that the end station of the user is to be coupled to, wherein said authentication is to utilize a Remote Authentication Dial-In User Service (RADIUS) protocol, and
communicatively couple, within the single network device through a binding data structure, the end station of the user with the identified virtual router of the plurality of virtual routers based on said determined information.

23. A network, comprising:
an Authentication, Authorization, and Accounting (AAA) server that stores a plurality of records, wherein each of the plurality of records comprises information to indicate which virtual router of a plurality of virtual routers a respective end station of a plurality of end stations is to be coupled to; and
a single network device coupled to the AAA server, wherein the single network device implements the plurality of virtual routers that share a set of physical resources of the single network device, wherein each of the plurality of virtual routers belongs to a different one of a plurality of virtual private networks, wherein the single network device includes,
a set of one or more processors,
communications hardware that transmits and receives packets to and from the plurality of end stations, and
a non-transitory computer-readable medium having stored therein a set of instructions that, when executed by the set of processors, cause the single network device to,
responsive to an initial communication with an end station of the plurality of end stations that is to be utilized by a user, authenticate the user with the AAA server to determine information that identifies a virtual router of the plurality of virtual routers that the end station of the user is to be coupled to, wherein said authentication is to utilize a Remote Authentication Dial-In User Service (RADIUS) protocol, and
communicatively couple, within the single network device through a binding data structure, the end station of the user with the identified virtual router of the plurality of virtual routers based on said determined information.

24. A method performed by a single network device configured to be communicatively coupled with a plurality of end stations, comprising:
receiving authentication and authorization information of a user from an Authentication, Authorization, and Accounting (AAA) server wherein the user utilizes an end station, wherein the authentication and authorization information indicates which of a plurality of virtual routers the end station is to be coupled to, wherein the single network device includes the plurality of virtual routers that share a set of physical resources of the single network device, and wherein each of the plurality of virtual routers belongs to a different one of a plurality of virtual private networks.

25. A method performed by a single network device configurable to be communicatively coupled with a plurality of end stations, wherein the single network device includes a plurality of virtual routers that share a set of physical resources of the single network device, and wherein each of the plurality of virtual routers belongs to a different one of a plurality of virtual private networks, the method comprising:
responsive to an initial communication with an end station of a user, receiving authentication and authorization information about the user from an Authentication, Authorization, and Accounting (AAA) server, the authentication and authorization information for identifying a virtual router of the plurality of virtual routers that the end station of the user is to be coupled to, wherein said AAA server utilizes a Remote Authentication Dial-In User Service (RADIUS) protocol; and
communicatively coupling, within the single network device through a binding data structure, the end station of the user with the virtual router of the plurality of virtual routers based on said authentication and authorization information.

26. A single network device to implement a plurality of virtual routers that share a set of physical resources of the single network device, wherein each of the plurality of virtual routers belongs to a different one of a plurality of virtual private networks, the single network device comprising:
a set of one or more processors;
communications hardware to transmit and receive packets to and from a plurality of end stations; and
a non-transitory computer-readable medium having stored therein a set of instructions that, when executed by the set of processors, cause the single network device to,
responsive to an initial communication with an end station of the plurality of end stations that is to be utilized by a user, receive authentication and authorization information about the user from an Authentication, Authorization, and Accounting (AAA) server that identifies a virtual router of the plurality of virtual routers that the end station of the user is to be coupled to, wherein said AAA server utilizes a Remote Authentication Dial-In User Service (RADIUS) protocol, and
communicatively couple, within the single network device through a binding data structure, the end station of the user with the identified virtual router of the plurality of virtual routers based on said authentication and authorization information.

\* \* \* \* \*

UNITED STATES PATENT AND TRADEMARK OFFICE
CERTIFICATE OF CORRECTION

PATENT NO. : 8,713,153 B2
APPLICATION NO. : 13/620539
DATED : April 29, 2014
INVENTOR(S) : Salkewicz It is certified that error appears in the above-identified patent and that said Letters Patent is hereby corrected as shown below:

In the Specification:

In Column 1, Line 36, delete "Corner," and insert -- Comer, --, therefor.

In Column 5, Line 46, delete "network Tunneling" and insert -- network. Tunneling --, therefor.

In Column 11, Line 7, delete "VNMO," and insert -- VNM0, --, therefor.

In Column 12, Line 29, delete "art Ethernet" and insert -- an Ethernet --, therefor.

Signed and Sealed this
Second Day of September, 2014

Michelle K. Lee
*Deputy Director of the United States Patent and Trademark Office*